US010257519B2

(12) United States Patent
Deshpande

(10) Patent No.: US 10,257,519 B2
(45) Date of Patent: Apr. 9, 2019

(54) SIGNALING AND DERIVATION OF DECODED PICTURE BUFFER PARAMETERS

(71) Applicant: Sharp Kabushiki Kaisha, Osaka-shi, Osaka (JP)

(72) Inventor: Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 256 days.

(21) Appl. No.: 15/100,699

(22) PCT Filed: Dec. 25, 2014

(86) PCT No.: PCT/JP2014/006465
§ 371 (c)(1),
(2) Date: Jun. 1, 2016

(87) PCT Pub. No.: WO2015/102044
PCT Pub. Date: Jul. 9, 2015

(65) Prior Publication Data
US 2016/0309159 A1  Oct. 20, 2016

Related U.S. Application Data

(60) Provisional application No. 61/923,177, filed on Jan. 2, 2014.

(51) Int. Cl.
*H04N 19/15* (2014.01)
*H04N 19/70* (2014.01)
(Continued)

(52) U.S. Cl.
CPC .......... *H04N 19/15* (2014.11); *H04L 1/0018* (2013.01); *H04N 19/124* (2014.11); *H04N 19/13* (2014.11);
(Continued)

(58) Field of Classification Search
CPC ....... H04N 19/15; H04N 19/172; H04N 19/43
See application file for complete search history.

(56) References Cited

U.S. PATENT DOCUMENTS

2014/0185681 A1  7/2014  Kwon et al.
2014/0185691 A1  7/2014  Kwon et al.
(Continued)

FOREIGN PATENT DOCUMENTS

WO  2014/167833 A1  10/2014
WO  2015/009719 A1  1/2015

OTHER PUBLICATIONS

Official Communication issued in International Patent Application No. PCT/JP2014/006465, dated Mar. 24, 2015.
(Continued)

*Primary Examiner* — Nam D Pham
(74) *Attorney, Agent, or Firm* — Keating & Bennett, LLP

(57) ABSTRACT

A system for decoding a video bitstream that includes a base bitstream and enhancement bitstreams is disclosed. The system receives a video parameter set and a video parameter set extension, where the video parameter set extension includes decoder picture buffer parameters. In one embodiment, a method for decoding a video sequence is disclosed. The method comprises: (a) receiving said video sequence; (b) determining the number of an output layer set for said video sequence; (c) determining a maximum number of sub-layers minus one for at least one of said at least one output layer set; (d) decoding a characteristic of a decoded picture buffer for a sub layer of one of said at least one output layer set.

1 Claim, 18 Drawing Sheets

(51) Int. Cl.

| | |
|---|---|
| H04N 19/30 | (2014.01) |
| H04N 19/124 | (2014.01) |
| H04N 19/13 | (2014.01) |
| H04N 19/159 | (2014.01) |
| H04N 19/172 | (2014.01) |
| H04N 19/43 | (2014.01) |
| H04N 19/42 | (2014.01) |
| H04N 19/61 | (2014.01) |
| H04L 1/00 | (2006.01) |

(52) U.S. Cl.
CPC ......... *H04N 19/159* (2014.11); *H04N 19/172* (2014.11); *H04N 19/30* (2014.11); *H04N 19/43* (2014.11); *H04N 19/439* (2014.11); *H04N 19/61* (2014.11); *H04N 19/70* (2014.11)

(56) References Cited

U.S. PATENT DOCUMENTS

| | | | | |
|---|---|---|---|---|
| 2014/0301441 | A1* | 10/2014 | Wang | H04N 19/597 375/240.02 |
| 2015/0172713 | A1* | 6/2015 | Komiya | H04N 19/597 375/240.15 |
| 2015/0245066 | A1* | 8/2015 | Sato | H04N 19/176 375/240.18 |

OTHER PUBLICATIONS

Hannuksela et al., "Draft Text for Scalable Extensions of High Efficiency Video Coding (HEVC)", Joint Collaborative Team on Video Coding (JCT-VC) of ITU-T SG16 WP3 and ISO/IEC JTC1/SC29/WG11, JCTVC-L0452-spec-text-rl, Oct. 10-19, 2012, 31 pages.

Hannuksela et al., "Test Model for Scalable Extensions of High Efficiency Video Coding (HEVC)", Joint Collaborative Team on Video Coding (JCT-VC) of ITU-T SG16 WP3 and ISO/IEC JTC1/SC29/WG11, JCTVC-L0453-spec-text, Oct. 10-19, 2012, 50 pages.

Chen et al., "High efficiency video coding (HEVC) scalable extension draft 3", Joint Collaborative Team on Video Coding (JCT-VC) of ITU-T SG 16 WP 3 and ISO/IEC JTC 1/SC 29/WG 11, JCTVC-N1008_v3, Jul. 25-Aug. 2, 2013, 68 pages.

Tech et al., "Preliminary version of MV-HEVC Draft Text 5", Joint Collaborative Team on 3D Video Coding Extension Development of ITU-T SG 16 WP 3 and ISO/IEC JTC 1/SC 29/WG 11, JCT3V-E1004-v3, Jul. 27-Aug. 2, 2013, 80 pages.

Hannuksela et al., "Common specification text for scalable and multi-view extensions (revision of JCTVC-L0188 straw-man text)", Joint Collaborative Team on Video Coding (JCT-VC) of ITU-T SG16 WP3 and ISO/IEC JTC 1/SC 29/WG 11, JCTVC-L0452, Jan. 14-23, 2013, pp. 1-2.

Chen et al., "SHVC Draft Text 1", Joint Collaborative Team on Video Coding (JCT-VC) of ITU-T SG16 WP3 and ISO/IEC JTC1/SC29/WG11, JCTVC-L1008, Jan. 14-23, 2013, 34 pages.

Hannuksela et al., "Test Model for Scalable Extensions of High Efficiency Video Coding (HEVC)", Joint Collaborative Team on Video Coding (JCT-VC) of ITU-T SG 16 WP3 and ISO/IEC JTC 1/SC 29/WG 11, JCTVC-L0453, Jan. 14-23, 2013, pp. 1-2.

Chen et al., "High efficiency video coding (HEVC) scalable extension Draft 4", Joint Collaborative Team on Video coding (JCT-VC) of ITU-T SG 16 WP 3 and ISO/IEC JTC 1/SC 29/WG 11, JCTVC-O1008_v1, Oct. 23-Nov. 1, 2013, 76 pages.

Tech et al., "Preliminary version of MV-HEVC Draft Text 6", Joint Collaborative Team on 3D Video Coding Extension Development of ITU-T SG 16 WP 3 and ISO/IEC JTC 1/SC 29/WG 11, JCT3V-F1004-v1, Oct. 25-Nov. 1, 2013, 86 pages.

Bross et al., "High Efficiency Video Coding (HEVC) text specification draft 10 (for FDIS & Consent)", Joint Collaborative Team on Video Coding (JCT-VC) of ITU-T SG 16 WP 3 and ISO/IEC JTC 1/SC 29/WG 11, JCTVC-L1003_v1, Jan. 14-23, 2013, 321 pages.

Deshpande, "On DPB Parameters in VPS", Joint Collaborative Team on Video Coding (JCT-VC) of ITU-T SG 16 WP 3 and ISO/IEC JTC 1/SC 29/WG 11, JCTVC-P0156, Jan. 9-17, 2014, pp. 1-6.

Choi et al., "MV-HEVC/SHVC HLS: Decoded picture buffer signalling", Joint Collaborative Team on Video Coding (JCT-VC) of ITU-T SG16 WP3 and ISO/IEC JTC 1/SC 29/WG 11, JCTVC-P0069, Jan. 9-17, 2014, pp. 1-12.

Deshpande, "On Signaling DPB Parameters in VPS", Joint Collaborative Team on Video Coding (JCT-VC) of ITU-T SG 16 WP3 and ISO/IEC JTC 1/SC 29/WG 11, JCTVC-N0197, Jul. 25-Aug. 2, 2013, pp. 1-6.

\* cited by examiner

| nal_unit_header( ) { | Descriptor |
|---|---|
| forbidden_zero_bit | f(1) |
| nal_unit_type | u(6) |
| nuh_reserved_zero_6bits | u(6) |
| nuh_temporal_id_plus1 | u(3) |
| } | |

NAL UNIT HEADER SYNTAX

FIG. 5A

| nal_unit_header( ) { | Descriptor |
|---|---|
| forbidden_zero_bit | f(1) |
| nal_unit_type | u(6) |
| layer_id_plus1 | u(6) |
| nuh_temporal_id_plus1 | u(3) |
| } | |

NAL UNIT HEADER SYNTAX

FIG. 5B

| nal_unit_header( ) { | Descriptor |
|---|---|
| forbidden_zero_bit | f(1) |
| nal_unit_type | u(6) |
| layer_id | u(6) |
| nuh_temporal_id_plus1 | u(3) |
| } | |

NAL UNIT HEADER SYNTAX

FIG. 5C

| | Descriptor |
|---|---|
| nal_unit( NumBytesInNALunit ) { | |
|   nal_unit_header( ) | |
|   NumBytesInRBSP = 0 | |
|   for( i = 2; i < NumBytesInNALunit; i++ ) { | |
|     if( i + 2 < NumBytesInNALunit && next_bits( 24 ) = = 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte  /* equal to 0x03 */ | f(8) |
|     } else | |
|       rbsp_byte[ NumBytesInRBSP++ ] | b(8) |
|   } | |
| } | |

GENERAL NAL UNIT SYNTAX

FIG. 6

| vps_extension( ) { | Descriptor |
|---|---|
| while( !byte_aligned( ) ) | |
| vps_extension_byte_alignment_reserved_one_bit | u(1) |
| ... | |
| num_output_layer_sets | ue(v) |
| for( i = 0; i < num_output_layer_sets; i++ ) { | |
| output_layer_set_idx [ i ] | ue(v) |
| lsIdx = output_layer_set_idx [ i ] | |
| for( j = 0 ; j < vps_max_layer_id; j++) | |
| if( layer_id_included_flag[ lsIdx ][ j ]) | |
| output_layer_flag[ lsIdx ][ j ] | u(1) |
| } | |
| num_op_dpb_info_parameters | ue(v) |
| for( i = 0; i < num_op_dpb_info_parameters; i++ ) { | |
| operation_point_layer_set_idx[i] | ue(v) |
| for( j = 0; j <= vps_max_layer_id; j++ ) | |
| op_dpb_info_parameters(j) | |
| } | |
| ... | |
| } | |

Fig. 6A

| vps_extension( ) { | Descriptor |
|---|---|
|   while( !byte_aligned( ) ) | |
|     vps_extension_byte_alignment_reserved_one_bit | u(1) |
|   ... | |
|   num_output_layer_sets | ue(v) |
|   for( i = 0; i < num_output_layer_sets; i++ ) { | |
|     output_layer_set_idx [ i ] | ue(v) |
|     lsIdx = output_layer_set_idx [ i ] | |
|     for( j = 0 ; j < vps_max_layer_id; j++) | |
|       if( layer_id_included_flag[ lsIdx ][ j ]) | |
|         output_layer_flag[ lsIdx ][ j ] | u(1) |
|   } | |
|   num_op_dpb_info_parameters | ue(v) |
|   for( i = 0; i < num_op_dpb_info_parameters; i++ ) { | |
|     operation_point_layer_set_idx[i] | ue(v) |
|     for( j = 0; j <= vps_max_layer_id; j++ ) | |
|       op_dpb_info_parameters(j) | |
| } | |
|   ... | |
| } | |

Fig. 6B

| vps_extension( ) { | Descriptor |
|---|---|
|   while( !byte_aligned( ) ) | |
|     vps_extension_byte_alignment_reserved_one_bit | u(1) |
|   ... | |
|   for( i = 1; i < NumOutputLayerSets; i++ ) { | |
|     vps_sub_layer_ordering_info_present_flag[ i ] | u(1) |
|     for( j =( vps_sub_layer_ordering_info_present_flag[ i ] ? 0: vps_max_sub_layers_minus1); j <= vps_max_sub_layers_minus1; j++ ) { | |
|       for( k = 0; k < NumLayersInOutputLayerSet[ i ]; k++ ) | |
|         max_vps_dec_pic_buffering_minus1[ i ][ k ][ j ] | ue(v) |
|         max_vps_num_reorder_pics[ i ][ j ] | ue(v) |
|         max_vps_latency_increase_plus1[ i ][ j ] | ue(v) |
|       } | |
|     } | |
|   } | |
|   ... | |
| } | |

Fig. 6X

| op_dpb_info_parameters(j) { | |
|---|---|
|   vps_max_sub_layers_minus1[ j ] | u(3) |
|   vps_sub_layer_ordering_info_present_flag[ j ] | u(1) |
|   for( k = ( vps_sub_layer_ordering_info_present_flag[ j ] ? 0 : vps_max_sub_layers_minus1[ j ] ); k <= vps_max_sub_layers_minus1[ j ]; k++ ) { | |
|     vps_max_dec_pic_buffering_minus1[ j ][ k ] | ue(v) |
|     vps_max_num_reorder_pics[ j ][ k ] | ue(v) |
|     vps_max_latency_increase_plus1[ j ][ k ] | ue(v) |
|   } | |
| } | |

Fig. 7A

| | |
|---|---|
| op_dpb_info_parameters( id, j ) { | |
| vps_max_sub_layers_minus1[ id ][ j ] | u(3) |
| vps_sub_layer_ordering_info_present_flag[ id ][ j ] | u(1) |
| for( k = ( vps_sub_layer_ordering_info_present_flag[ id ][ j ] ? 0 : vps_max_sub_layers_minus1[ id ][ j ] ); k <= vps_max_sub_layers_minus1[ id ][ j ]; k++ ) { | |
| vps_max_dec_pic_buffering_minus1[ id ][ j ][ k ] | ue(v) |
| vps_max_num_reorder_pics[ id ][ j ][ k ] | ue(v) |
| vps_max_latency_increase_plus1[ id ][ j ][ k ] | ue(v) |
| } | |
| } | |

Fig. 7B

| vps_extension( ) { | Descriptor |
|---|---|
|   while( !byte_aligned( ) ) | |
|     vps_extension_byte_alignment_reserved_one_bit | u(1) |
|   ... | |
|   num_output_layer_sets | ue(v) |
|   for( i = 0; i < num_output_layer_sets; i++ ) { | |
|     output_layer_set_idx[ i ] | ue(v) |
|     lsIdx = output_layer_set_idx[ i ] | |
|     for( j = 0 ; j <= vps_max_layer_id; j++) | |
|       if( layer_id_included_flag[ lsIdx ][ j ] ) | |
|         output_layer_flag[ lsIdx ][ j ] | u(1) |
|   } | |
|   num_dpb_info_parameters | ue(v) |
|   for( i = 0; i < num_dpb_info_parameters; i++ ) { | |
|     output_point_layer_set_idx[i] | ue(v) |
|     opIsIdx=output_point_layer_set_idx[i] | |
|     for( j = 0; j <= vps_max_layer_id; j++) | |
|       oop_dpb_info_parameters(j) | |
|   } | |
|   ... | |
| } | |

Fig. 8

| op_dpb_info_parameters(j) { | |
|---|---|
| vps_max_sub_layers_minus1[ j ] | u(3) |
| vps_sub_layer_ordering_info_present_flag[ j ] | u(1) |
| for( k = ( vps_sub_layer_ordering_info_present_flag[ j ] ? 0 : vps_max_sub_layers_minus1[ j ] ); k <= vps_max_sub_layers_minus1[ j ]; k++ ) { | |
| vps_max_dec_pic_buffering_minus1[ j ][ k ] | ue(v) |
| vps_max_num_reorder_pics[ j ][ k ] | ue(v) |
| vps_max_latency_increase_plus1[ j ][ k ] | ue(v) |
| } | |
| } | |

Fig. 9

| op_dpb_info_parameters() { | |
|---|---|
| vps_max_sub_layers_minus1 | u(3) |
| vps_sub_layer_ordering_info_present_flag | u(1) |
| for( k = ( vps_sub_layer_ordering_info_present_flag ? 0 : vps_max_sub_layers_minus1 ); k <= vps_max_sub_layers_minus1; k++ ) { | |
| vps_max_dec_pic_buffering_minus1[ k ] | ue(v) |
| vps_max_num_reorder_pics[ k ] | ue(v) |
| vps_max_latency_increase_plus1[ k ] | ue(v) |
| } | |
| } | |

Fig. 10

| num_dpb_info_parameters | ue(v) |
|---|---|
| for( i = 0; i < num_dpb_info_parameters; i++ ) { | |
| output_point_layer_set_idx[i] | ue(v) |
| opIsIdx=output_point_layer_set_idx[i] | |
| for( j = 0; j <= vps_max_layer_id; j++ ) | |
| op_dpb_info_parameters() | |
| } | |

Fig. 11

| | |
|---|---|
| oop_dpb_info_parameters( id, j ) { | |
| vps_max_sub_layers_minus1[ id ][ j ] | u(3) |
| vps_sub_layer_ordering_info_present_flag[ id ][ j ] | u(1) |
| for( k = ( vps_sub_layer_ordering_info_present_flag[ id ][ j ] ? 0 : vps_max_sub_layers_minus1[ id ][ j ] ); k <= vps_max_sub_layers_minus1[ id ][ j ]; k++ ) { | |
| vps_max_dec_pic_buffering_minus1[ id ][ j ][ k ] | ue(v) |
| vps_max_num_reorder_pics[ id ][ j ][ k ] | ue(v) |
| vps_max_latency_increase_plus1[ id ][ j ][ k ] | ue(v) |
| } | |
| } | |

Fig. 12

| | |
|---|---|
| num_dpb_info_parameters | ue(v) |
| for( i = 0; i < num_dpb_info_parameters; i++ ) { | |
| output_point_layer_set_idx[i] | ue(v) |
| oplsIdx=output_point_layer_set_idx[i] | |
| for( j = 0; j <= vps_max_layer_id; j++ ) | |
| oop_dpb_info_parameters(oplsIdx,j) | |
| } | |

Fig. 13

| | |
|---|---|
| num_dpb_info_parameters | ue(v) |
| for( i = 0; i < num_dpb_info_parameters; i++ ) { | |
| output_point_layer_set_idx[i] | ue(v) |
| oplsIdx=output_point_layer_set_idx[i] | |
| for( j = 0; j <= vps_max_layer_id; j++ ) | |
| oop_dpb_info_parameters(i,j) | |
| } | |

Fig. 14

| vps_extension( ) { | Descriptor |
|---|---|
|   while( !byte_aligned( ) ) | |
|     vps_extension_byte_alignment_reserved_one_bit | u(1) |
|   ... | |
|   for( i = 1; i <= vps_max_layers_minus1; i++ ) { | |
|     layer_dpb_info(i) | |
|   } | |
|   ... | |
| } | |

| layer_dpb_info (i) { | |
|---|---|
|   vps_max_sub_layers_minus1[ i ] | u(3) |
|   vps_sub_layer_ordering_info_present_flag[ i ] | u(1) |
|   for( k = ( vps_sub_layer_ordering_info_present_flag[ i ] ? 0 : vps_max_sub_layers_minus1[ i ] ); k <= vps_max_sub_layers_minus1[ i ]; k++ ) { | |
|     vps_max_dec_pic_buffering_minus1[ i ][ k ] | ue(v) |
|     vps_max_num_reorder_pics[ i ][ k ] | ue(v) |
|     vps_max_latency_increase_plus1[ i ][ k ] | ue(v) |
|   } | |
| } | |

Fig. 15

| | |
|---|---|
| oop_dpb_info_parameters(id) / op_dpb_info_parameters( id)/ layer_dpb_info(id) { | |
| vps_sub_layer_ordering_info_present_flag[id] | u(1) |
| for( i = ( vps_sub_layer_ordering_info_present_flag ? 0 : vps_max_sub_layers_minus1 ); i <= vps_max_sub_layers_minus1; i++ ) { | |
| vps_max_dec_pic_buffering_minus1[id][ i ] | ue(v) |
| vps_max_num_reorder_pics[id][ i ] | ue(v) |
| vps_max_latency_increase_plus1[id][ i ] | ue(v) |
| } | |
| } | |

Fig. 16

SIGNALING AND DERIVATION OF DECODED PICTURE BUFFER PARAMETERS

BACKGROUND ART

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and rapid playback presents several challenges. As can be observed from this discussion, systems and methods that represent digital media efficiently with improved performance may be beneficial.

The foregoing and other objectives, features, and advantages of the invention will be more readily understood upon consideration of the following detailed description of the invention, taken in conjunction with the accompanying drawings.

SUMMARY OF INVENTION

One embodiment of the present invention discloses a method for decoding a video sequence that includes a picture comprising:
(a) receiving said video sequence;
(b) determining the number of an output layer set for said video sequence;
(c) determining a maximum number of sub-layers minus one for at least one of said at least one output layer set;
(d) decoding a characteristic of a decoded picture buffer for a sub layer of one of said at least one output layer set.

BRIEF DESCRIPTION OF DRAWINGS

FIG. 5A illustrates different NAL Unit header syntax.
FIG. 5B illustrates different NAL Unit header syntax.
FIG. 5C illustrates different NAL Unit header syntax.
FIG. 6 illustrates a general NAL Unit syntax.
FIG. 6A illustrates an exemplary video parameter extension syntax.
FIG. 6B illustrates an exemplary video parameter extension syntax.
FIG. 6X illustrates an exemplary video parameter extension syntax.
FIG. 7A illustrates an exemplary op_dpb_info_parameters(j) syntax.
FIG. 7B illustrates an exemplary op_dpb_info_parameters(j) syntax.
FIG. 8 illustrates another exemplary video parameter extension syntax.
FIG. 9 illustrates another exemplary oop_dpb_info_parameters(j) syntax.
FIG. 10 illustrates another exemplary oop_dpb_info_parameters(j) syntax.
FIG. 11 illustrates an exemplary num_dpb_info_parameters syntax.
FIG. 12 illustrates another exemplary oop_dpb_info_parameters(j) syntax.
FIG. 13 illustrates another exemplary num_dpb_info_parameters syntax.
FIG. 14 illustrates another exemplary num_dpb_info_parameters syntax.
FIG. 15 illustrates another exemplary video parameter extension syntax and layer_dpb_info(i).
FIG. 16 illustrates an exemplary oop_dpb_info_parameters and layer_dpb_info(i) syntax.

DESCRIPTION OF EMBODIMENTS

Figure 1A:
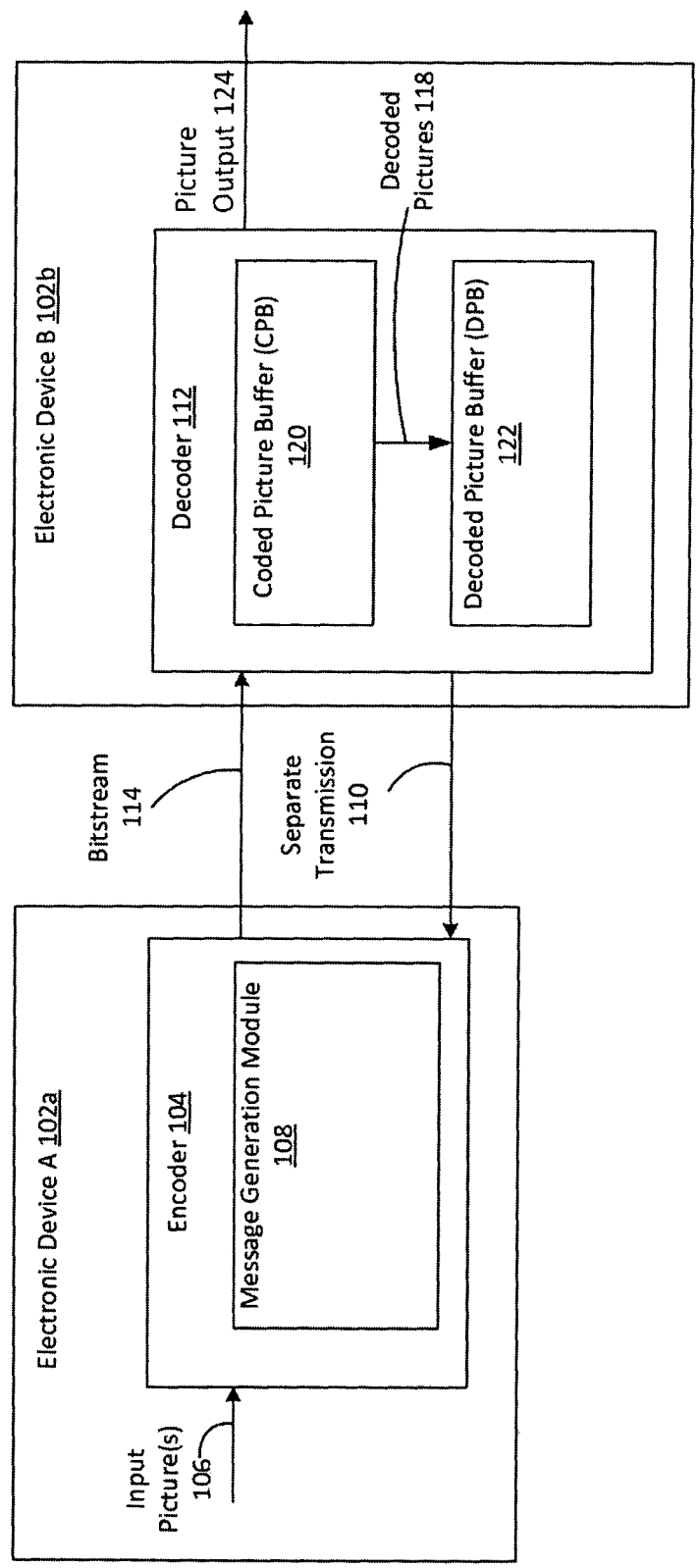
FIG. 1A is a block diagram illustrating an example of one or more electronic devices in which systems and methods for sending a message and buffering a bitstream may be implemented.

FIG. 1A is a block diagram illustrating an example of one or more electronic devices 102. In this example, electronic device A 102a and electronic device B 102b are illustrated, although either may be omitted, as desired. However, it should be noted that one or more of the features and functionality described in relation to electronic device A 102a and electronic device B 102b may be combined into a single electronic device in some configurations.

Electronic device A 102a includes an encoder 104. The encoder 104 includes a message generation module 108. Each of the elements included within electronic device A 102a (e.g., the encoder 104 and the message generation module 108) may be implemented in hardware, software, or a combination of both.

Electronic device A 102a may obtain one or more input pictures 106. In some configurations, the input picture(s) 106 may be captured on electronic device A 102a using an image sensor, may be retrieved from memory and/or may be received from another electronic device.

The encoder 104 may encode the input picture(s) 106 to produce encoded data. For example, the encoder 104 may encode a series of input pictures 106 (e.g., video). In one configuration, the encoder 104 may be a HEVC encoder. The encoded data may be digital data (e.g., part of a bitstream 114). The encoder 104 may generate overhead signaling based on the input signal.

The message generation module 108 may generate one or more messages. For example, the message generation module 108 may generate one or more SEI messages or other messages. For a CPB that supports operation on a sub-picture level, the electronic device 102 may send sub-picture parameters, (e.g., CPB removal delay parameter). Specifically, the electronic device 102 (e.g., the encoder 104) may determine whether to include a common decoding unit CPB removal delay parameter in a picture timing SEI message. For example, the electronic device may set a flag (e.g., common_du_cpb_removal_delay_flag) to one when the encoder 104 is including a common decoding unit CPB removal delay parameter (e.g., common_du_cpb_removal_delay) in the picture timing SEI message. When the common decoding unit CPB removal delay parameter is included, the electronic device may generate the common decoding unit CPB removal delay parameter that is applicable to all decoding units in an access unit. In other words, rather than including a decoding unit CPB removal delay parameter for each decoding unit in an access unit, a common parameter may apply to all decoding units in the access unit with which the picture timing SEI message is associated.

In contrast, when the common decoding unit CPB removal delay parameter is not to be included in the picture timing SEI message, the electronic device 102 may generate a separate decoding unit CPB removal delay for each decoding unit in the access unit with which the picture timing SEI message is associated.

In some configurations, electronic device A 102a may send the message to electronic device B 102b as part of the bitstream 114. In some configurations electronic device A 102a may send the message to electronic device B 102b by a separate transmission 110. For example, the separate transmission may not be part of the bitstream 114. For instance, a picture timing SEI message or other message may be sent using some out-of-band mechanism. It should be noted that, in some configurations, the other message may include one or more of the features of a picture timing SEI message described above. Furthermore, the other message, in one or more aspects, may be utilized similarly to the SEI message described above.

The encoder 104 (and message generation module 108, for example) may produce a bitstream 114. The bitstream 114 may include encoded picture data based on the input picture(s) 106. In some configurations, the bitstream 114 may also include overhead data, such as a picture timing SEI message or other message, slice header(s), PPS(s), etc. As additional input pictures 106 are encoded, the bitstream 114 may include one or more encoded pictures. For instance, the bitstream 114 may include one or more encoded pictures with corresponding overhead data (e.g., a picture timing SEI message or other message).

The bitstream 114 may be provided to a decoder 112. In one example, the bitstream 114 may be transmitted to electronic device B 102b using a wired or wireless link. In some cases, this may be done over a network, such as the Internet or a Local Area Network (LAN). As illustrated in FIG. 1A, the decoder 112 may be implemented on electronic device B 102b separately from the encoder 104 on electronic device A 102a. However, it should be noted that the encoder 104 and decoder 112 may be implemented on the same electronic device in some configurations. In an implementation where the encoder 104 and decoder 112 are implemented on the same electronic device, for instance, the bitstream 114 may be provided over a bus to the decoder 112 or stored in memory for retrieval by the decoder 112.

The decoder 112 may be implemented in hardware, software or a combination of both. In one configuration, the decoder 112 may be a HEVC decoder. The decoder 112 may receive (e.g., obtain) the bitstream 114. The decoder 112 may generate one or more decoded pictures 118 based on the bitstream 114. The decoded picture(s) 118 may be displayed, played back, stored in memory and/or transmitted to another device, etc.

The decoder 112 may include a CPB 120. The CPB 120 may temporarily store encoded pictures. The CPB 120 may use parameters found in a picture timing SEI message to determine when to remove data. When the CPB 120 supports operation on a sub-picture level, individual decoding units may be removed rather than entire access units at one time. The decoder 112 may include a Decoded Picture Buffer (DPB) 122. Each decoded picture is placed in the DPB 122 for being referenced by the decoding process as well as for output and cropping. A decoded picture is removed from the DPB at the later of the DPB output time or the time that it becomes no longer needed for inter-prediction reference.

The decoder 112 may receive a message (e.g., picture timing SEI message or other message). The decoder 112 may also determine whether the received message includes a common decoding unit CPB removal delay parameter (e.g., common_du_cpb_removal_delay). This may include identifying a flag (e.g., common_du_cpb_removal_delay_flag) that is set when the common parameter is present in the picture timing SEI message. If the common parameter is present, the decoder 112 may determine the common decoding unit CPB removal delay parameter applicable to all decoding units in the access unit. If the common parameter is not present, the decoder 112 may determine a separate decoding unit CPB removal delay parameter for each decoding unit in the access unit. The decoder 112 may also remove decoding units from the CPB 120 using either the common decoding unit CPB removal delay parameter or the separate decoding unit CPB removal delay parameters.

The decoded picture buffer (DPB) 122 may include separately identified and managed picture buffers for decoded pictures having different characteristics. For example, the decoded picture buffer (DPB) 122 may include separately identified and managed picture buffers for decoded pictures with different resolutions, different bit-depths and/or different color chromaticity.

A decoded picture may instead be stored in a common pool of picture storage buffers in the decoded picture buffer (DPB) 122. For example, two additional sub-cases may be used to determine the decoded picture buffer (DPB) 122 size constraints that affect the bumping/removal process and level definitions. In a byte based decoded picture buffer (DPB) 122 constraint, a decoded picture may be stored with consideration for the size based on resolution and/or bit-depth. The decoded picture buffer (DPB) 122 size constraints may be defined as a byte limit that considers resolution and bit-depth of each decoded picture. In a picture unit based decoded picture buffer (DPB) 122 constraint, a decoded picture may be stored (and is considered to take one picture buffer slot). The decoded picture buffer (DPB) 122 size constraints may then be defined as a number of picture slots limit without considering resolution and bit-depth of each decoded picture.

In one configuration, the decoded picture buffer (DPB) fullness may be tracked per layer. For example, the decoded picture buffer (DPB) 122 size constraints may be signaled, and bumping may be applied, per layer. Where each layer with layer identifier nuh_layer_id includes its own picture storage buffers a variable DPBFullness[nuh_layer_id] could be used to track to the decoded picture buffer (DPB) fullness of each layer. When a picture is removed from a layer with a layer ID value equal to nuh_layer_id, the variable DPB-Fullness[nuh_layer_id] may be set equal to DPBFullness

[nuh_layer_id]−1 (i.e., DPBFullness[nuh_layer_id] may be decremented by one). In this case, the picture was removed from a picture storage buffer PSB[nuh_layer_id].

Similarly, when a currently decoded picture with a layer ID value equal to nuh_layer_id is stored in the decoded picture buffer (DPB) 122, the variable DPBFullness [nuh_layer_id] is set equal to DPBFullness[nuh_layer_id]+1 (i.e., DPBFullness[nuh_layer_id] is incremented by one). In this case, the picture was stored into a picture storage buffer PSB[nuh_layer_id].

The decoded picture buffer (DPB) fullness could also be tracked for an output layer set. The decoded picture buffer (DPB) 122 size constraints may then be signaled, and bumping may be applied, based on the constraints specified for an output layer set. A DPBFullness value could be tracked for the output layer set which is associated with the operation point under test. Thus, when a picture is removed from a layer belonging to the output layer set, the value of the decoded picture buffer (DPB) fullness may be decremented by one as DPBFullness=DPBFullness−1. Likewise, when a currently decoded picture is stored in the decoded picture buffer (DPB) 122, the decoded picture buffer (DPB) fullness may be decremented by one as DPBFullness=DPBFullness+1.

The HRD described above may be one example of the decoder 112 illustrated in FIG. 1A. Thus, an electronic device 102 may operate in accordance with the HRD and CPB 120 and DPB 122 described above, in some configurations.

A Coded Picture Buffer (CPB) may be a first-in first-out buffer containing access units in decoding order specified in a hypothetical reference decoder (HRD). An access unit may be a set of Network Access Layer (NAL) units that are consecutive in decoding order and contain exactly one coded picture. In addition to the coded slice NAL units of the coded picture, the access unit may also contain other NAL units not containing slices of the coded picture. The decoding of an access unit results in a decoded picture. A NAL unit may be a syntax structure containing an indication of the type of data to follow and bytes containing that data in the form of a raw byte sequence payload interspersed as necessary with emulation prevention bytes.

It should be noted that one or more of the elements or parts thereof included in the electronic device(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an Application-Specific Integrated Circuit (ASIC), a LargeScale Integrated circuit (LSI) or integrated circuit, etc.

Figure 1B:
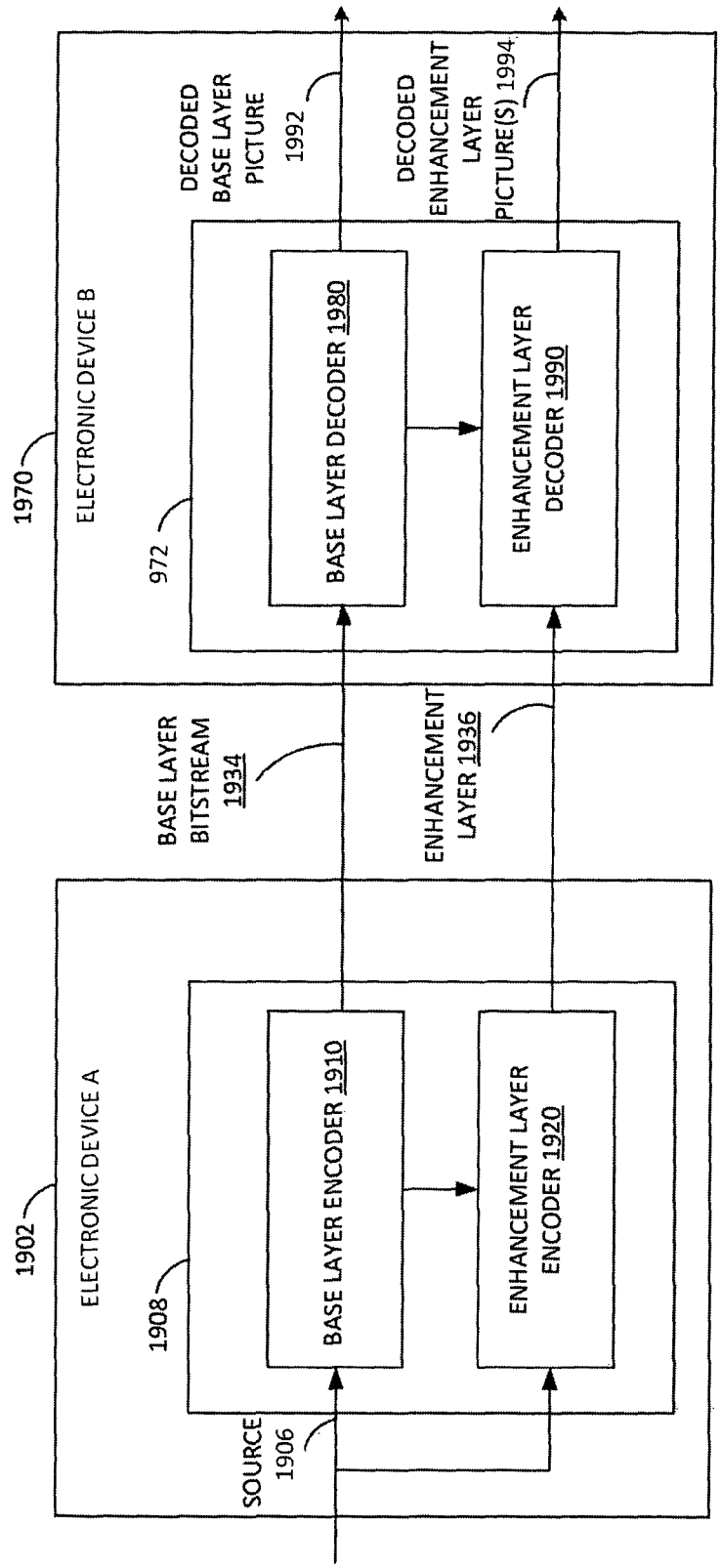
FIG. 1B is another block diagram illustrating an example of one or more electronic devices in which systems and methods for sending a message and buffering a bitstream may be implemented.

FIG. 1B is a block diagram illustrating another example of an encoder 1908 and a decoder 1972. In this example, electronic device A 1902 and electronic device B 1970 are illustrated. However, it should be noted that the features and functionality described in relation to electronic device A 1902 and electronic device B 1970 may be combined into a single electronic device in some configurations.

Electronic device A 1902 includes the encoder 1908. The encoder 1908 may include a base layer encoder 1910 and an enhancement layer encoder 1920. The video encoder 1908 is suitable for scalable video coding and multi-view video coding, as described later. The encoder 1908 may be implemented in hardware, software or a combination of both. In one configuration, the encoder 1908 may be a high-efficiency video coding (HEVC) coder, including scalable and/or multi-view. HEVC specification may include, B. Bros, W-J. Han, J-R Ohm, G. J. Sullivan, and T. Wiegand, "High efficiency video coding (HEVC) text specification draft 10", JCTVC-L1003, Geneva, January 2013, incorporated by reference herein in its entirety; a multi-view specification may include, G. Tech, K. Wegner, Y. Chen, M. Hannuksela, J. Boyce, "MV-HEVC Draft Text 6 (ISO/IEC 23008-2:201x/PDAM2)", JCT3V-F1004, Geneva, November, 2013, incorporated by reference herein in its entirety; and the scalable specification may include, J. Chen, J. Boyce, Y. Ye, M. Hannuksela, "SHVC Draft 4", JCTVC-O1008, Geneva, November 2013 incorporated by reference herein in its entirety. Other coders may likewise be used, as desired. Electronic device A 1902 may obtain a source 1906. In some configurations, the source 1906 may be captured on electronic device A 1902 using an image sensor, retrieved from memory or received from another electronic device.

The encoder 1908 may code the source 1906 to produce a base layer bitstream 1934 and an enhancement layer bitstream 1936. For example, the encoder 1908 may code a series of pictures (e.g., video) in the source 1906. In particular, for scalable video encoding for SNR scalability also known as quality scalability the same source 1906 may be provided to the base layer and the enhancement layer encoder. In particular, for scalable video encoding for spatial scalability a downsampled source may be used for the base layer encoder. In particular, for multi-view encoding a different view source may be used for the base layer encoder and the enhancement layer encoder. The encoder 1908 may be similar to the encoder 1782 described later in connection with FIG. 2B.

The bitstreams 1934, 1936 may include coded picture data based on the source 1906. In some configurations, the bitstreams 1934, 1936 may also include overhead data, such as slice header information, PPS information, etc. As additional pictures in the source 1906 are coded, the bitstreams 1934, 1936 may include one or more coded pictures.

The bitstreams 1934, 1936 may be provided to the decoder 1972. The decoder 1972 may include a base layer decoder 1980 and an enhancement layer decoder 1990. The video decoder 1972 is suitable for scalable video decoding and multi-view video decoding. In one example, the bitstreams 1934, 1936 may be transmitted to electronic device B 1970 using a wired or wireless link. In some cases, this may be done over a network, such as the Internet or a Local Area Network (LAN). As illustrated in FIG. 1B, the decoder 1972 may be implemented on electronic device B 1970 separately from the encoder 1908 on electronic device A 1902. However, it should be noted that the encoder 1908 and decoder 1972 may be implemented on the same electronic device in some configurations. In an implementation where the encoder 1908 and decoder 1972 are implemented on the same electronic device, for instance, the bitstreams 1934, 1936 may be provided over a bus to the decoder 1972 or stored in memory for retrieval by the decoder 1972. The decoder 1972 may provide a decoded base layer 1992 and decoded enhancement layer picture(s) 1994 as output.

The decoder 1972 may be implemented in hardware, software or a combination of both. In one configuration, the decoder 1972 may be a high-efficiency video coding (HEVC) decoder, including scalable and/or multi-view. Other decoders may likewise be used. The decoder 1972 may be similar to the decoder 1812 described later in connection with FIG. 3B. Also, the base layer encoder and/or the enhancement layer encoder may each include a message generation module, such as that described in relation to FIG. 1A. Also, the base layer decoder and/or the enhancement layer decoder may include a coded picture buffer and/or a decoded picture buffer, such as that described in relation to FIG. 1A. In addition, the electronic devices of FIG. 1B may operate in accordance with the functions of the electronic devices of FIG. 1A, as applicable.

Figure 2A:
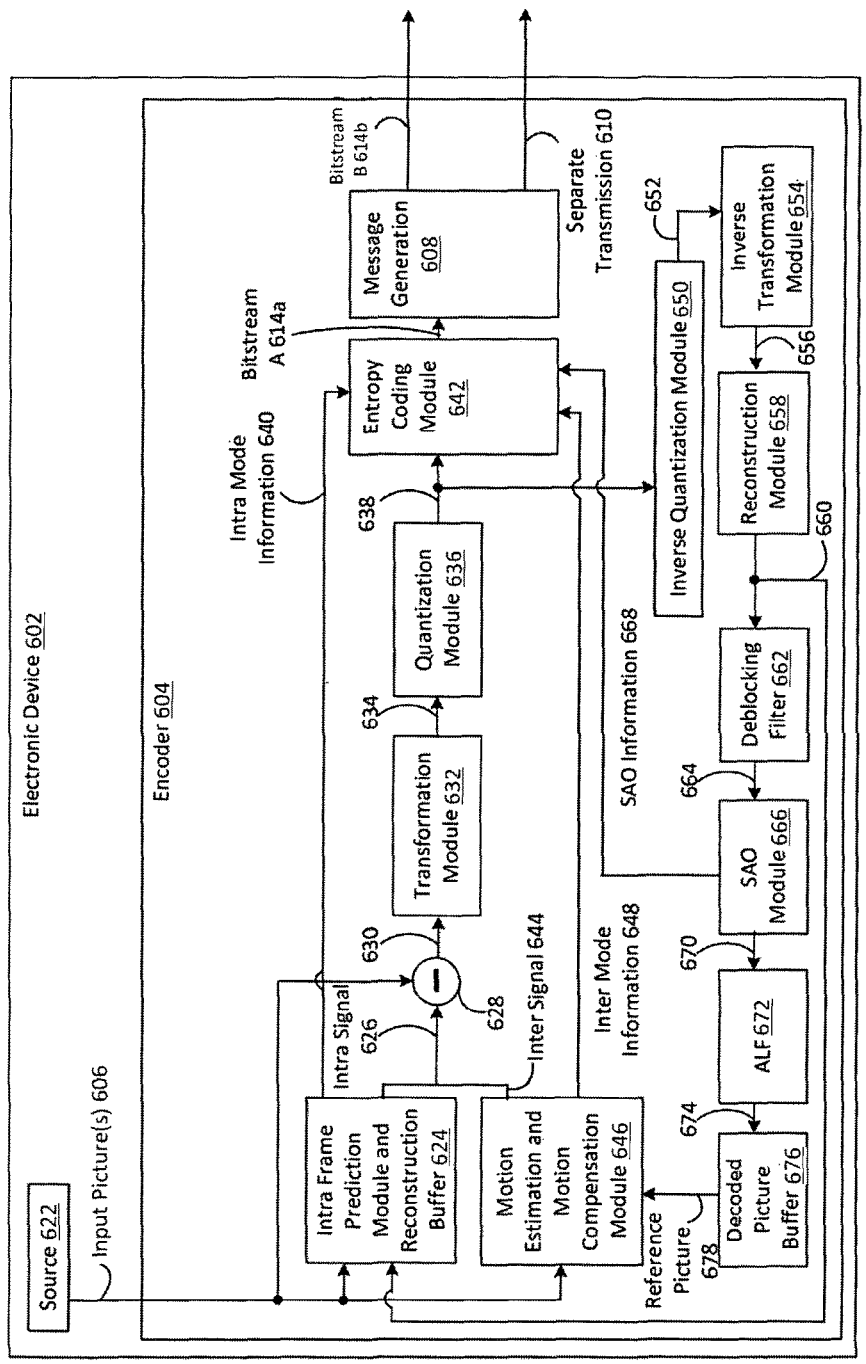
FIG. 2A is a block diagram illustrating one configuration of an encoder 604 on an electronic device.

FIG. 2A is a block diagram illustrating one configuration of an encoder 604 on an electronic device 602. It should be noted that one or more of the elements illustrated as included within the electronic device 602 may be implemented in hardware, software or a combination of both. For example, the electronic device 602 includes an encoder 604, which may be implemented in hardware, software or a combination of both. For instance, the encoder 604 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 604 may be a HEVC coder.

The electronic device 602 may include a source 622. The source 622 may provide picture or image data (e.g., video) as one or more input pictures 606 to the encoder 604. Examples of the source 622 may include image sensors, memory, communication interfaces, network interfaces, wireless receivers, ports, etc.

One or more input pictures 606 may be provided to an intra-frame prediction module and reconstruction buffer 624. An input picture 606 may also be provided to a motion estimation and motion compensation module 646 and to a subtraction module 628.

The intra-frame prediction module and reconstruction buffer 624 may generate intra mode information 640 and an intra-signal 626 based on one or more input pictures 606 and reconstructed data 660. The motion estimation and motion compensation module 646 may generate inter mode information 648 and an inter signal 644 based on one or more input pictures 606 and a reference picture 678 from decoded picture buffer 676. In some configurations, the decoded picture buffer 676 may include data from one or more reference pictures in the decoded picture buffer 676.

The encoder 604 may select between the intra signal 626 and the inter signal 644 in accordance with a mode. The intra signal 626 may be used in order to exploit spatial characteristics within a picture in an intra-coding mode. The inter signal 644 may be used in order to exploit temporal characteristics between pictures in an inter coding mode. While in the intra coding mode, the intra signal 626 may be provided to the subtraction module 628 and the intra mode information 640 may be provided to an entropy coding module 642. While in the inter coding mode, the inter signal 644 may be provided to the subtraction module 628 and the inter mode information 648 may be provided to the entropy coding module 642.

Either the intra signal 626 or the inter signal 644 (depending on the mode) is subtracted from an input picture 606 at the subtraction module 628 in order to produce a prediction residual 630. The prediction residual 630 is provided to a transformation module 632. The transformation module 632 may compress the prediction residual 630 to produce a transformed signal 634 that is provided to a quantization module 636. The quantization module 636 quantizes the transformed signal 634 to produce transformed and quantized coefficients (TQCs) 638.

The TQCs 638 are provided to an entropy coding module 642 and an inverse quantization module 650. The inverse quantization module 650 performs inverse quantization on the TQCs 638 to produce an inverse quantized signal 652 that is provided to an inverse transformation module 654. The inverse transformation module 654 decompresses the inverse quantized signal 652 to produce a decompressed signal 656 that is provided to a reconstruction module 658.

The reconstruction module 658 may produce reconstructed data 660 based on the decompressed signal 656. For example, the reconstruction module 658 may reconstruct (modified) pictures. The reconstructed data 660 may be provided to a deblocking filter 662 and to the intra prediction module and reconstruction buffer 624. The deblocking filter 662 may produce a filtered signal 664 based on the reconstructed data 660.

The filtered signal 664 may be provided to a sample adaptive offset (SAO) module 666. The SAO module 666 may produce SAO information 668 that is provided to the entropy coding module 642 and an SAO signal 670 that is provided to an adaptive loop filter (ALF) 672. The ALF 672 produces an ALF signal 674 that is provided to the decoded picture buffer 676. The ALF signal 674 may include data from one or more pictures that may be used as reference pictures.

The entropy coding module 642 may code the TQCs 638 to produce bitstream A 614a (e.g., encoded picture data). For example, the entropy coding module 642 may code the TQCs 638 using Context-Adaptive Variable Length Coding (CAVLC) or Context-Adaptive Binary Arithmetic Coding (CABAC). In particular, the entropy coding module 642 may code the TQCs 638 based on one or more of intra mode information 640, inter mode information 648 and SAO information 668. Bitstream A 614a (e.g., encoded picture data) may be provided to a message generation module 608. The message generation module 608 may be configured similarly to the message generation module 108 described in connection with FIG. 1.

For example, the message generation module 608 may generate a message (e.g., picture timing SEI message or other message) including sub-picture parameters. The sub-picture parameters may include one or more removal_delays for decoding units (e.g., common_du_cpb_removal_delay or du_cpb_removal_delay[i]) and one or more NAL parameters (e.g., common_num_nalus_in_du_minus1 or num_nalus_in_du_minus1[i]). In some configurations, the message may be inserted into bitstream A 614a to produce bitstream B 614b. Thus, the message may be generated after the entire bitstream A 614a is generated (e.g., after most of bitstream B 614b is generated), for example. In other configurations, the message may not be inserted into bitstream A 614a (in which case bitstream B 614b may be the same as bitstream A 614a), but may be provided in a separate transmission 610.

In some configurations, the electronic device 602 sends the bitstream 614 to another electronic device. For example, the bitstream 614 may be provided to a communication interface, network interface, wireless transmitter, port, etc. For instance, the bitstream 614 may be transmitted to another electronic device via LAN, the Internet, a cellular phone base station, etc. The bitstream 614 may additionally or alternatively be stored in memory or other component on the electronic device 602.

Figure 2B:
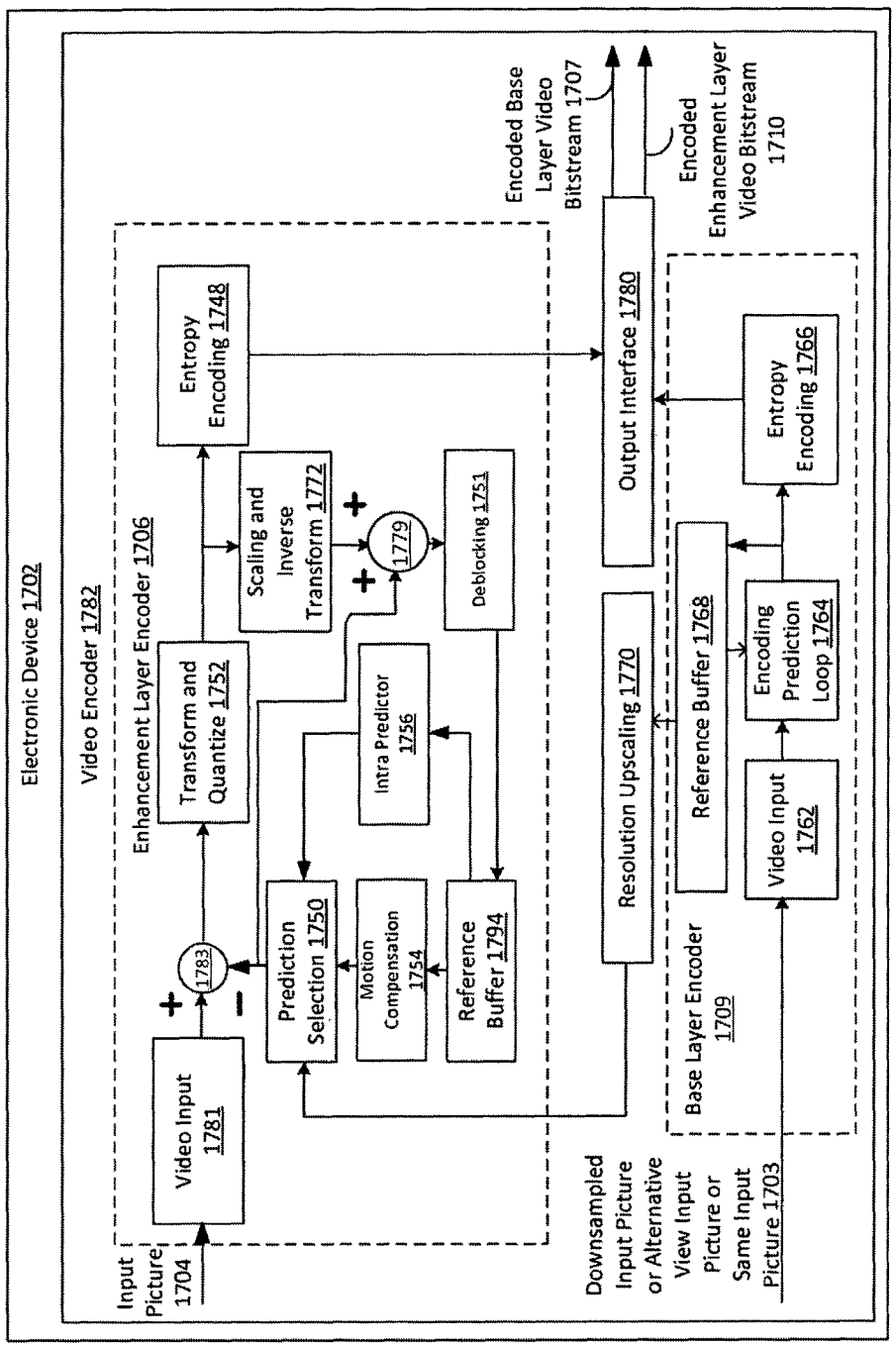
FIG. 2B is another block diagram illustrating one configuration of an encoder 604 on an electronic device.

FIG. 2B is a block diagram illustrating one configuration of a video encoder 1782 on an electronic device 1702. The video encoder 1782 may include an enhancement layer encoder 1706, a base layer encoder 1709, a resolution upscaling block 1770 and an output interface 1780. The video encoder of FIG. 2B, for example, is suitable for scalable video coding and multi-view video coding, as described herein.

The enhancement layer encoder 1706 may include a video input 1781 that receives an input picture 1704. The output of the video input 1781 may be provided to an adder/subtractor 1783 that receives an output of a prediction selection 1750. The output of the adder/subtractor 1783 may be provided to a transform and quantize block 1752. The output of the transform and quantize block 1752 may be provided to an entropy encoding 1748 block and a scaling and inverse transform block 1772. After entropy encoding 1748 is performed, the output of the entropy encoding block 1748 may be provided to the output interface 1780. The output interface 1780 may output both the encoded base layer video bitstream 1707 and the encoded enhancement layer video bitstream 1710.

The output of the scaling and inverse transform block 1772 may be provided to an adder 1779. The adder 1779 may also receive the output of the prediction selection 1750. The output of the adder 1779 may be provided to a deblocking block 1751. The output of the deblocking block 1751 may be provided to a reference buffer 1794. An output of the reference buffer 1794 may be provided to a motion compensation block 1754. The output of the motion compensation block 1754 may be provided to the prediction selection 1750. An output of the reference buffer 1794 may also be provided to an intra predictor 1756. The output of the intra predictor 1756 may be provided to the prediction selection 1750. The prediction selection 1750 may also receive an output of the resolution upscaling block 1770.

The base layer encoder 1709 may include a video input 1762 that receives a downsampled input picture, or other image content suitable for combing with another image, or an alternative view input picture or the same input picture 1703 (i.e., the same as the input picture 1704 received by the enhancement layer encoder 1706). The output of the video input 1762 may be provided to an encoding prediction loop 1764. Entropy encoding 1766 may be provided on the output of the encoding prediction loop 1764. The output of the encoding prediction loop 1764 may also be provided to a reference buffer 1768. The reference buffer 1768 may provide feedback to the encoding prediction loop 1764. The output of the reference buffer 1768 may also be provided to the resolution upscaling block 1770. Once entropy encoding 1766 has been performed, the output may be provided to the output interface 1780. The encoded base layer video bitstream 1707 and/or the encoded enhancement layer video bitstream 1710 may be provided to one or more message generation modules, as desired.

Figure 3A:
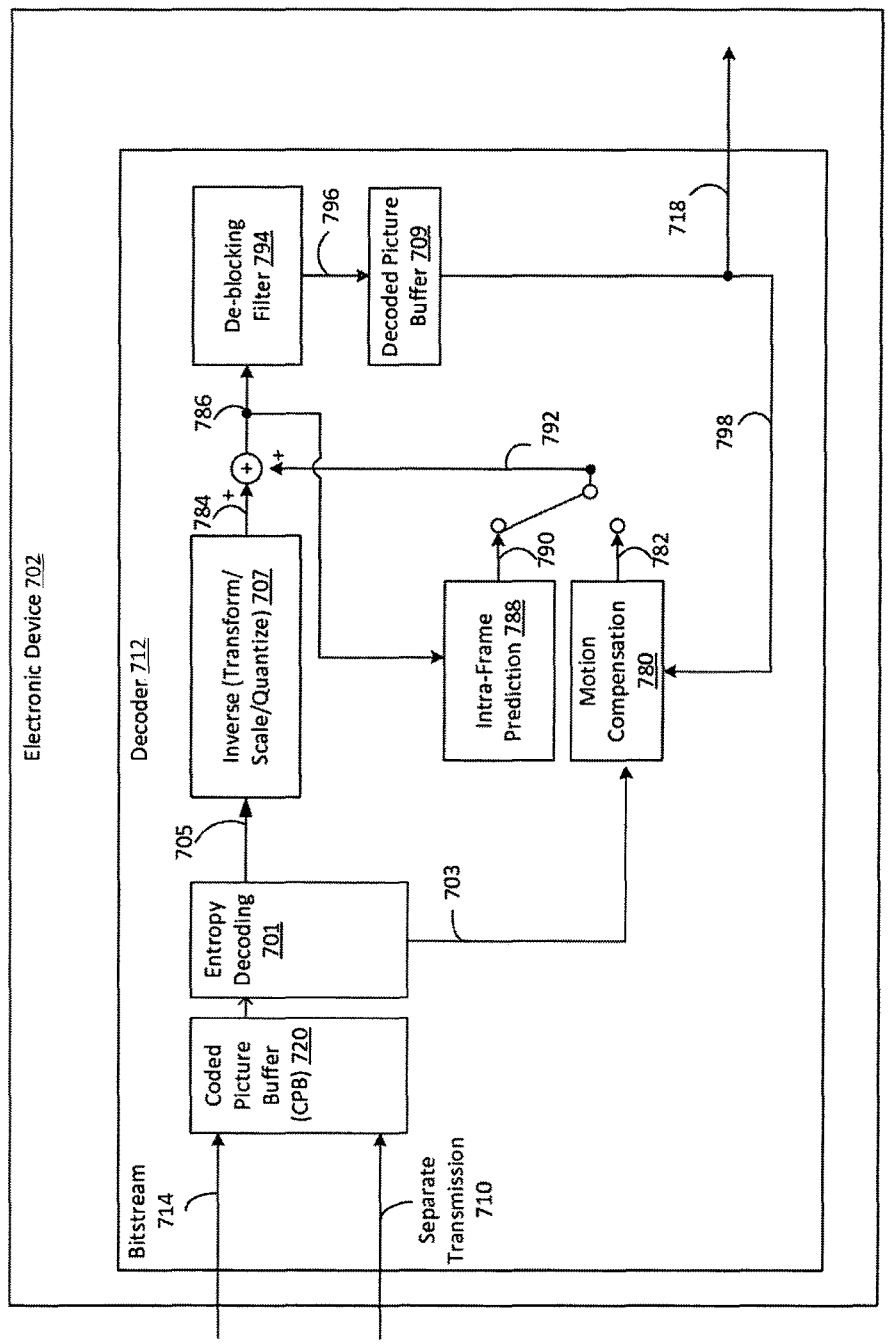
FIG. 3A is a block diagram illustrating one configuration of a decoder on an electronic device.

FIG. 3A is a block diagram illustrating one configuration of a decoder 712 on an electronic device 702. The decoder 712 may be included in an electronic device 702. For example, the decoder 712 may be a HEVC decoder. The decoder 712 and one or more of the elements illustrated as included in the decoder 712 may be implemented in hardware, software or a combination of both. The decoder 712 may receive a bitstream 714 (e.g., one or more encoded pictures and overhead data included in the bitstream 714) for decoding. In some configurations, the received bitstream 714 may include received overhead data, such as a message (e.g., picture timing SEI message or other message), slice header, PPS, etc. In some configurations, the decoder 712 may additionally receive a separate transmission 710. The separate transmission 710 may include a message (e.g., a picture timing SEI message or other message). For example, a picture timing SEI message or other message may be received in a separate transmission 710 instead of in the bitstream 714. However, it should be noted that the separate transmission 710 may be optional and may not be utilized in some configurations.

The decoder 712 includes a CPB 720. The CPB 720 may be configured similarly to the CPB 120 described in connection with FIG. 1 above. The decoder 712 may receive a message (e.g., picture timing SEI message or other message) with sub-picture parameters and remove and decode decoding units in an access unit based on the sub-picture parameters. It should be noted that one or more access units may be included in the bitstream and may include one or more of encoded picture data and overhead data.

The Coded Picture Buffer (CPB) 720 may provide encoded picture data to an entropy decoding module 701. The encoded picture data may be entropy decoded by an entropy decoding module 701, thereby producing a motion information signal 703 and quantized, scaled and/or transformed coefficients 705.

The motion information signal 703 may be combined with a portion of a reference frame signal 798 from a decoded picture buffer 709 at a motion compensation module 780, which may produce an inter-frame prediction signal 782. The quantized, descaled and/or transformed coefficients 705 may be inverse quantized, scaled and inverse transformed by an inverse module 707, thereby producing a decoded residual signal 784. The decoded residual signal 784 may be added to a prediction signal 792 to produce a combined signal 786. The prediction signal 792 may be a signal selected from either the inter-frame prediction signal 782 produced by the motion compensation module 780 or an intra-frame prediction signal 790 produced by an intra-frame prediction module 788. In some configurations, this signal selection may be based on (e.g., controlled by) the bitstream 714.

The intra-frame prediction signal 790 may be predicted from previously decoded information from the combined signal 786 (in the current frame, for example). The combined signal 786 may also be filtered by a de-blocking filter 794. The resulting filtered signal 796 may be written to decoded picture buffer 709. The resulting filtered signal 796 may include a decoded picture. The decoded picture buffer 709 may provide a decoded picture which may be outputted 718. In some cases 709 may be a considered as frame memory.

Figure 3B:
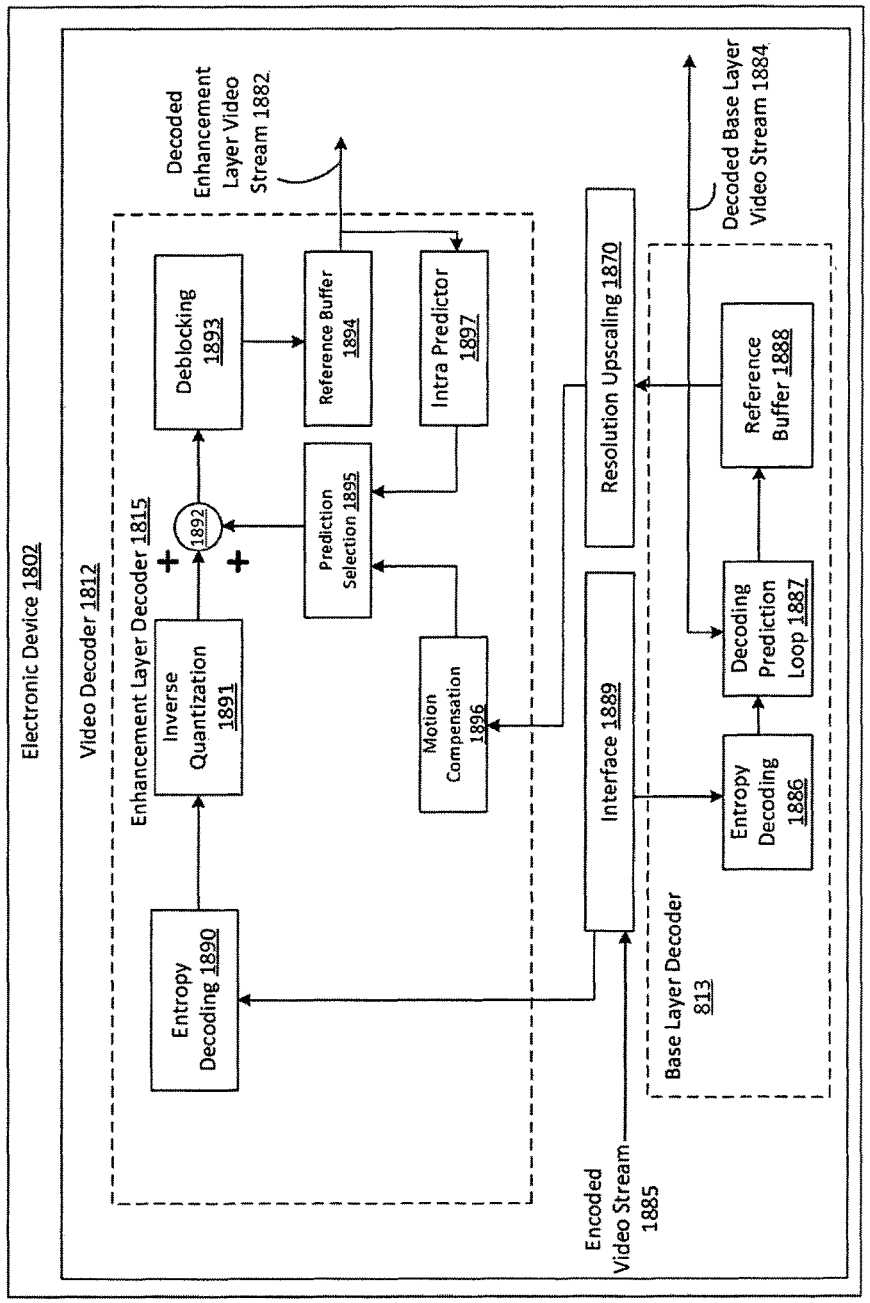
FIG. 3B is another block diagram illustrating one configuration of a decoder on an electronic device.

FIG. 3B is a block diagram illustrating one configuration of a video decoder 1812 on an electronic device 1802. The video decoder 1812 may include an enhancement layer decoder 1815 and a base layer decoder 1813. The video decoder 812 may also include an interface 1889 and resolution upscaling 1870. The video decoder of FIG. 3B, for example, is suitable for scalable video coding and multi-view video encoded, as described herein.

The interface 1889 may receive an encoded video stream 1885. The encoded video stream 1885 may consist of base layer encoded video stream and enhancement layer encoded video stream. These two streams may be sent separately or together. The interface 1889 may provide some or all of the encoded video stream 1885 to an entropy decoding block 1886 in the base layer decoder 1813. The output of the entropy decoding block 1886 may be provided to a decoding prediction loop 1887. The output of the decoding prediction loop 1887 may be provided to a reference buffer 1888. The reference buffer may provide feedback to the decoding prediction loop 1887. The reference buffer 1888 may also output the decoded base layer video stream 1884.

The interface 1889 may also provide some or all of the encoded video stream 1885 to an entropy decoding block 1890 in the enhancement layer decoder 1815. The output of the entropy decoding block 1890 may be provided to an inverse quantization block 1891. The output of the inverse quantization block 1891 may be provided to an adder 1892. The adder 1892 may add the output of the inverse quantization block 1891 and the output of a prediction selection block 1895. The output of the adder 1892 may be provided to a deblocking block 1893. The output of the deblocking block 1893 may be provided to a reference buffer 1894. The reference buffer 1894 may output the decoded enhancement layer video stream 1882. The output of the reference buffer 1894 may also be provided to an intra predictor 1897. The enhancement layer decoder 1815 may include motion compensation 1896. The motion compensation 1896 may be performed after the resolution upscaling 1870. The prediction selection block 1895 may receive the output of the intra predictor 1897 and the output of the motion compensation 1896. Also, the decoder may include one or more coded picture buffers, as desired, such as together with the interface 1889.

Figure 4:
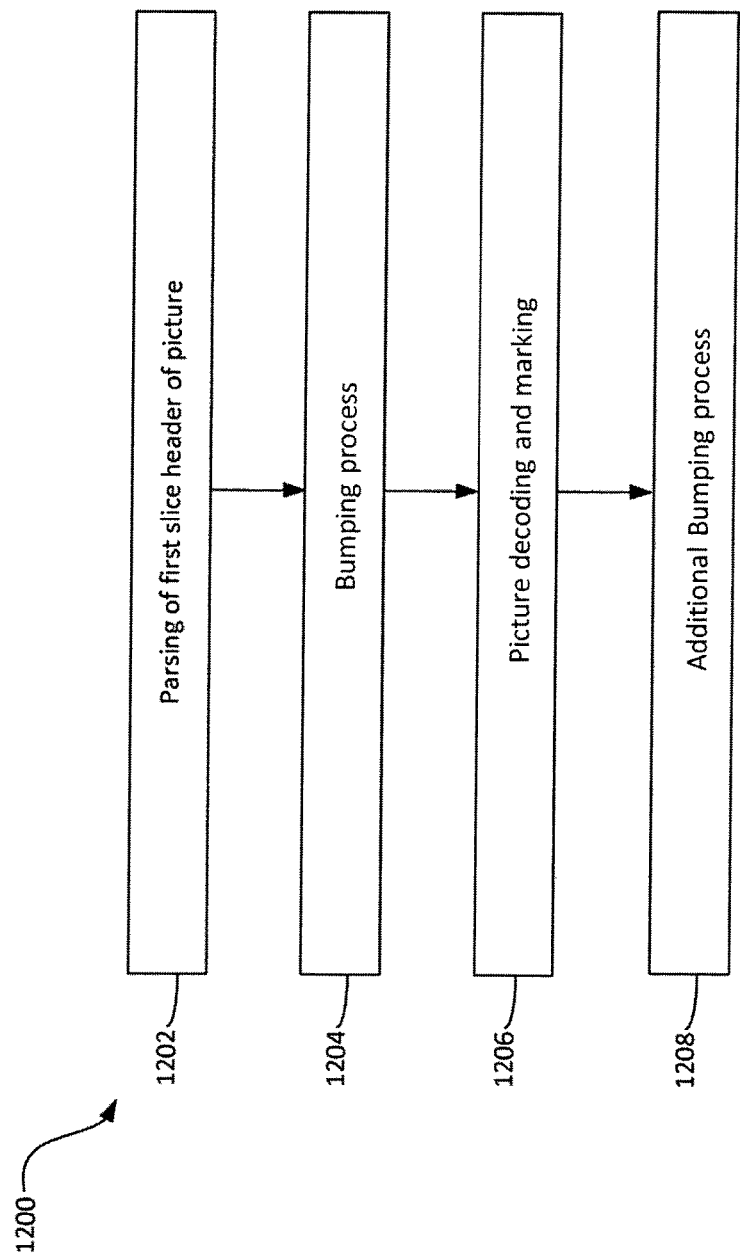
FIG. 4 is a block diagram illustrating one configuration of a method for operation of a decoded picture buffer.

FIG. 4 is a flow diagram illustrating one configuration of a method 1200 for operation of decoded picture buffer (DPB). The method 1200 may be performed by an encoder 104 or one of its sub-parts (e.g., a decoded picture buffer module 676). The method 1200 may be performed by a decoder 112 in an electronic device 102 (e.g., electronic device B 102b). Additionally or alternatively the method 1200 may be performed by a decoder 712 or one of its sub-parts (e.g., a decoded picture buffer module 709). The decoder may parse first slice header of a picture 1202. The output and removal of pictures from DPB before decoding of the current picture (but after parsing the slice header of the first slice of the current picture) happens instantaneously when first decoding unit of the access unit containing the current picture is removed from the CPB and proceeds as follows.

The decoding process for reference picture set (RPS) is invoked. Reference picture set is a set of reference pictures associated with a picture, consisting of all reference pictures that are prior to the associated picture in decoding order, that may be used for inter prediction of the associated picture or any picture following the associated picture in decoding order.

The bitstream of the video may include a syntax structure that is placed into logical data packets generally referred to as Network Abstraction Layer (NAL) units. Each NAL unit includes a NAL unit header, such as a two-byte NAL unit header (e.g., 16 bits), to identify the purpose of the associated data payload. For example, each coded slice (and/or picture) may be coded in one or more slice (and/or picture) NAL units. Other NAL units may be included for other categories of data, such as for example, supplemental enhancement information, coded slice of temporal sub-layer access (TSA) picture, coded slice of step-wise temporal sub-layer access (STSA) picture, coded slice a non-TSA, non-STSA trailing picture, coded slice of broken link access picture, coded slice of instantaneous decoded refresh picture, coded slice of clean random access picture, coded slice of decodable leading picture, coded slice of tagged for discard picture, video parameter set, sequence parameter set, picture parameter set, access unit delimiter, end of sequence, end of bitstream, filler data, and/or sequence enhancement information message. Table (1) illustrates one example of NAL unit codes and NAL unit type classes. Other NAL unit types may be included, as desired. It should also be understood that the NAL unit type values for the NAL units shown in the Table (1) may be reshuffled and reassigned. Also additional NAL unit types may be added. Also some NAL unit types may be removed.

An intra random access point (IRAP) picture is a coded picture for which each video coding layer NAL unit has nal_unit_type in the range of BLA_W_LP to RSV_I_RAP_VCL23, inclusive as shown in Table (1). An IRAP picture contains only Intra coded (I) slices. An instantaneous decoding refresh (IDR) picture is an IRAP picture for which each video coding layer NAL unit has nal_unit_type equal to IDR_W_RADL or IDR_N_LP as shown in Table (1). An instantaneous decoding referesh (IDR) picture contains only I slices, and may be the first picture in the bitstream in decoding order, or may appear later in the bitstream. Each IDR picture is the first picture of a coded video sequence (CVS) in decoding order. A broken link access (BLA) picture is an IRAP picture for which each video coding layer NAL unit has nal_unit_type equal to BLA_W_LP, BLA_W_RADL, or BLA_N_LP as shown in Table (1). A BLA picture contains only I slices, and may be the first picture in the bitstream in decoding order, or may appear later in the bitstream. Each BLA picture begins a new coded video sequence, and has the same effect on the decoding process as an IDR picture. However, a BLA picture contains syntax elements that specify a non-empty reference picture set.

TABLE (1)

| nal_unit_type | Name of nal_unit_type | Content of NAL unit and raw byte sequence payload (RBSP) syntax structure | NAL unit type class |
|---|---|---|---|
| 0 | TRAIL_N | Coded slice segment of a non-TSA, non-STSA trailing picture slice_segment_layer_rbsp( ) | Video Coding Layer (VCL) |
| 1 | TRAIL_R | | |
| 2 | TSA_N | Coded slice segment of a temporal sub-layer access (TSA) picture slice_segment_layer_rbsp( ) | VCL |
| 3 | TSA_R | | |
| 4 | STSA_N | Coded slice segment of an Step-wise Temporal sub-layer access (STSA) picture slice_segment_layer_rbsp( ) | VCL |
| 5 | STSA_R | | |
| 6 | RADL_N | Coded slice segment of a random access decodable leading (RADL) picture slice_segment_layer_rbsp( ) | VCL |
| 7 | RADL_R | | |

TABLE (1)-continued

| nal_unit_type | Name of nal_unit_type | Content of NAL unit and raw byte sequence payload (RBSP) syntax structure | NAL unit type class |
|---|---|---|---|
| 8 | RASL_N | Coded slice segment of a random access skipped leading (RASL) picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a broken link access (BLA) picture slice_segment_layer_rbsp( ) | VCL |
| 17 | BLA_W_RADL | | |
| 18 | BLA_N_LP | | |
| 19 | IDR_W_RADL | Coded slice segment of an instantaneous decoding refresh (IDR) picture slice_segment_layer_rbsp( ) | VCL |
| 20 | IDR_N_LP | | |
| 21 | CRA_NUT | Coded slice segment of a clean random access (CRA) picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24 ... 31 | RSV_VCL24..RSV_VCL31 | Reserved non-IRAP VCL NAL unit types | VCL |
| 32 | VPS_NUT | Video parameter set video_parameter_set_rbsp( ) | non-video coding layer (non-VCL) |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41 ... 47 | RSV_NVCL41..RSV_NVCL47 | Reserved | non-VCL |
| 48 ... 63 | UNSPEC48..UNSPEC63 | Unspecified | non-VCL |

Referring to Table (2), the NAL unit header syntax may include two bytes of data, namely, 16 bits. The first bit is a "forbidden_zero_bit" which is always set to zero at the start of a NAL unit. The next six bits is a "nal_unit_type" which specifies the type of raw byte sequence payloads ("RBSP") data structure contained in the NAL unit as shown in Table (1). The next 6 bits is a "nuh_layer_id" which specify the indentifier of the layer. In some cases these six bits may be specified as "nuh_reserved_zero_6bits" instead. The nuh_reserved_zero_6bits may be equal to 0 in the base specification of the standard. In a scalable video coding and/or syntax extensions nuh_layer_id may specify that this particular NAL unit belongs to the layer identified by the value of these 6 bits. The next syntax element is "nuh_temporal_id_plus1". The nuh_temporal_id_plus1 minus 1 may specify a temporal identifier for the NAL unit. The variable temporal identifier TemporalId may be specified as TemporalId=nuh_temporal_id_plus1−1. The temporal identifier TemporalId is used to identify a temporal sub-layer. The variable HighestTid identifies the highest temporal sub-layer to be decoded.

TABLE (2)

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

Table (3) shows an exemplary sequence parameter set (SPS) syntax structure.

pic_width_in_luma_samples specifies the width of each decoded picture in units of luma samples. pic_width_in_luma_samples shall not be equal to 0.

pic_height_in_luma_samples specifies the height of each decoded picture in units of luma samples. pic_height_in_luma_samples shall not be equal to 0.

sps_max_sub_layers_minus1 plus 1 specifies the maximum number of temporal sub-layers that may be present in each CVS referring to the SPS. The value of sps_max_sub_layers_minus1 shall be in the range of 0 to 6, inclusive.

sps_sub_layer_ordering_info_present_flag flag equal to 1 specifies that sps_max_dec_pic_buffering_minus1[i], sps_max_num_reorder_pics[i], and sps_max_latency_increase_plus1[i] syntax elements are present for sps_max_sub_layers_minus1+1 sub-layers. sps_sub_layer_ordering_info_present_flag equal to 0 specifies that the values of sps_max_dec_pic_buffering_minus1[sps_max_sub_layers_minus1], sps_max_num_reorder_pics[sps_max_sub_layers_minus1], and sps_max_latency_increase_plus1[sps_max_sub_layers_minus1] apply to all sub-layers.

sps_max_dec_pic_buffering_minus1[i] plus 1 specifies the maximum required size of the decoded picture buffer for the CVS in units of picture storage buffers when HighestTid is equal to i. The value of sps_max_dec_pic_buffering_minus1[i] shall be in the range of 0 to MaxDpbSize−1, inclusive where MaxDpbSize specifies the maximum decoded picture buffer size in units of picture storage buffers. When i is greater than 0, sps_max_dec_pic_buffering_minus1[i] shall be greater than or equal to sps_max_dec_pic_buffering_minus1[i−1]. When sps_max_dec_pic_buffering_minus1[i] is not present for i in the range of 0 to sps_max_sub_layers_minus1−1, inclusive, due to sps_sub_layer_ordering_info_present_flag being equal to 0, it is inferred to be equal to sps_max_dec_pic_buffering_minus1[sps_max_sub_layers_minus1].

sps_max_num_reorder_pics[i] indicates the maximum allowed number of pictures that can precede any picture in the CVS in decoding order and follow that picture in output order when HighestTid is equal to i. The value of sps_max_num_reorder_pics[i] shall be in the range of 0 to sps_max_dec_pic_buffering_minus1[i], inclusive. When i is greater than 0, sps_max_num_reorder_pics[i] shall be greater than or equal to sps_max_num_reorder_pics[i−1]. When sps_max_num_reorder_pics[i] is not present for i in the range of 0 to sps_max_sub_layers_minus1−1, inclusive, due to sps_sub_layer_ordering_info_present_flag being equal to 0, it is inferred to be equal to sps_max_num_reorder_pics[sps_max_sub_layers_minus1].

sps_max_latency_increase_plus1[i] not equal to 0 is used to compute the value of SpsMaxLatencyPictures[i], which specifies the maximum number of pictures that can precede any picture in the CVS in output order and follow that picture in decoding order when HighestTid is equal to i.

When sps_max_latency_increase_plus1[i] is not equal to 0, the value of SpsMaxLatencyPictures[i] is specified as follows:

SpsMaxLatencyPictures[i]=sps_max_num_reorder_pics[i]+sps_max_latency_increase_plus1[i]−1

When sps_max_latency_increase_plus1[i] is equal to 0, no corresponding limit is expressed.

The value of sps_max_latency_increase_plus1[i] shall be in the range of 0 to $2^{32}-2$, inclusive. When sps_max_latency_increase_plus1[i] is not present for i in the range of 0 to sps_max_sub_layers_minus1−1, inclusive, due to sps_sub_layer_ordering_info_present_flag being equal to 0, it is inferred to be equal to sps_max_latency_increase_plus1[sps_max_sub_layers_minus1].

TABLE (3)

```
seq_parameter_set_rbsp( ) {
   ...
   sps_max_sub_layers_minus1
   ...
   pic_width_in_luma_samples
   pic_height_in_luma_samples
   ...
   for( i = ( sps_sub_layer_ordering_info_present_flag ? 0 :
   sps_max_sub_layers_minus1 );
       i <= sps_max_sub_layers_minus1; i++ ) {
       sps_max_dec_pic_buffering_minus1[ i ]
       sps_max_num_reorder_pics[ i ]
       sps_max_latency_increase_plus1[ i ]
   }
   ...
}
```

Referring to FIG. 5A, as previously described the NAL unit header syntax may include two bytes of data, namely, 16 bits. The first bit is a "forbidden_zero_bit" which is always set to zero at the start of a NAL unit. The next six bits is a "nal_unit_type" which specifies the type of raw byte sequence payloads ("RBSP") data structure contained in the NAL unit. The next 6 bits is a "nuh_reserved_zero_6bits". The nuh_reserved_zero_6bits may be equal to 0 in the base specification of the standard. Other values of nuh_reserved_zero_6bits may be specified as desired. Decoders may ignore (i.e., remove from the bitstream and discard) all NAL units with values of nuh_reserved_zero_6bits not equal to 0 when handling a stream based on the base specification of the standard. In a scalable or other extension nuh_reserved_zero_6bits may specify other values, to signal scalable video coding and/or syntax extensions. In some cases syntax element nuh_reserved_zero_6bits may be called reserved_zero_6bits. In some cases the syntax element nuh_reserved_zero_6bits may be called as layer_id_plus1 or layer_id, as illustrated in FIG. 5B and FIG. 5C. In this case the element layer_id will be layer_id_plus1 minus 1. In this case it may be used to signal information related to layer of scalable coded video. The next syntax element is "nuh_temporal_id_plus1". nuh_temporal_id_plus1 minus 1 may specify a temporal identifier for the NAL unit. The variable temporal identifier TemporalId may be specified as TemporalId=nuh_temporal_id_plus1−1.

Referring to FIG. 6, a general NAL unit syntax structure is illustrated. The NAL unit header two byte syntax of FIG. 5 is included in the reference to nal_unit_header( ) of FIG. 6. The remainder of the NAL unit syntax primarily relates to the RBSP.

One existing technique for using the "nuh_reserved_zero_6bits" is to signal scalable video coding information by partitioning the 6 bits of the nuh_reserved_zero_6bits into distinct bit fields, namely, one or more of a dependency ID, a quality ID, a view ID, and a depth flag, each of which refers to the identification of a different layer of the scalable coded video. Accordingly, the 6 bits indicate what layer of the scalable encoding technique this particular NAL unit belongs to.}

As previously described, scalable video coding is a technique of encoding a video bitstream that also contains one or more subset bitstreams. A subset video bitstream may be derived by dropping packets from the larger video to reduce the bandwidth required for the subset bitstream. The subset bitstream may represent a lower spatial resolution (smaller screen), lower temporal resolution (lower frame rate), or lower quality video signal. For example, a video bitstream may include 5 subset bitstreams, where each of the subset bitstreams adds additional content to a base bitstream. Hannuksela, et al., "Test Model for Scalable Extensions of High Efficiency Video Coding (HEVC)" JCTVC-L0453, Shanghai, October 2012, is hereby incorporated by reference herein in its entirety. Chen, et al., "SHVC Draft Text 1," JCTVC-L1008, Geneva, March, 2013, is hereby incorporated by reference herein in its entirety.

As previously described, multi-view video coding is a technique of encoding a video bitstream that also contains one or more other bitstreams representative of alternative views. For example, the multiple views may be a pair of views for stereoscopic video. For example, the multiple views may represent multiple views of the same scene from different viewpoints. The multiple views generally contain a large amount of inter-view statistical dependencies, since the images are of the same scene from different viewpoints. Therefore, combined temporal and inter-view prediction may achieve efficient multi-view encoding. For example, a frame may be efficiently predicted not only from temporally related frames, but also from the frames of neighboring viewpoints. B. Bros, W-J. Han, J-R. Ohm, G. J. Sullivan, and T. Wiegand, "High efficiency video coding (HEVC) text specification draft 10," JCTVC-L1003 is hereby incorporated by reference herein in its entirety. Hannuksela, et al., "Common specification text for scalable and multi-view extensions," JCTVC-L0452, Geneva, January 2013, is hereby incorporated by reference herein in its entirety. Tech, et. al. "MV-HEVC Draft Text 5 (ISO/IEC 23008-2:201x/PDAM2)," JCT3V-E1004_d3, Vienna, August 2013, is hereby incorporated by reference herein in its entirety.

Chen, et al., "SHVC Draft 3," JCTVC-N1008, Vienna, August 2013; Hannuksela, et al. "Test Model for Scalable Extensions of High Efficiency Video Coding (HEVC)," JCTVC-L0453-spec-text, Shanghai, October 2012; and Hannuksela, "Draft Text for Multiview Extension of High Efficiency Video Coding (HEVC)," JCTVC-L0452-spec-text-r1, Shanghai, October 2012; each of which is incorporated by reference herein in its entirety, each have an output order decoded picture buffer (DPB) which operates based on using sps_max_num_reorder_pics[HighestTid], sps_max_latency_increase_plus1[HighestTid] and sps_max_dec_pic_buffering[HighestTid] syntax elements for the output and removal of pictures 0 from the DPB. This information is signaled in the video parameter set for the base layer, which provides buffering information for the video content including the enhancement layers, if any.

It was determined that signaling the output order decoded picture buffer (DPB) based on using sps_max_num_reorder_pics[HighestTid], sps_max_latency_increase_plus1[HighestTid] and sps_max_dec_pic_buffering[HighestTid] syntax elements for the output and removal of pictures from the DPB does not account for the buffer characteristics that may result from scalable video coding, such as when different numbers of enhancement layers are used which tends to vary after the content has been encoded based upon the user's viewing preferences, and the multi-view enhancement layers which tends to vary after the content has been encoded based upon the user's viewing preferences. Also it was determined that signaling the output order decoded picture buffer (DPB) based on using sps_max_num_reorder_pics[HighestTid], sps_max_latency_increase_plus1[HighestTid] and sps_max_dec_pic_buffering[HighestTid] syntax elements for the output and removal of pictures from the DPB may not be optimal in terms of the memory usage of the DPB when decoder operates at a certain operation point and/or is outputting selected output layer set. To accommodate such differences in the viewing preferences, the output order decoded picture buffer (DPB) may further and/or alternatively be based upon such syntax elements being included together with the video parameter set extension (VPS extension) to provide syntax elements for one or more of the enhancement layers. In this manner the syntax elements may be selected to be especially suitable for the particular operation point or output layer set, which tends to correspond to the user's viewing preferences.

The DPB buffering related parameters, vps_max_dec_pic_buffering_minus1, vps_max_num_reorder_pics, vps_max_latency_increase_plus1 may be signaled for sub-layers for the CVS for one or more operation points and/or for output layer sets in VPS extension. Similarly, the system may define the operation and bumping process for the output order DPB to use the above signalled DPB buffering parameters from the VPS extension if they are signalled for the operation point under test or for the selected output layer set. Otherwise the corresponding SPS level parameters from the active SPS (when currLayerId which corresponds to nuh_layer_id of the current picture is equal to 0) or from the active layer SPS depending upon the layer_id of the current layer are used.

An exemplary vps_extension syntax is defined in JCTVC-N1008 and JCT3V-E1004 which is incorporated here by reference. Referring to FIG. 6X, an exemplary modified vps_extension is illustrated. The modified vps extension includes new syntax, namely, vps_sub_layer_ordering_info_present_flag[i], max_vps_dec_pic_buffering_minus1[i][k][j], max_vps_num_reorder_pics[i][j], max_vps_latency_increase_plus1[i][j]. NumOutputLayerSets may be derived as defined in JCTVC-N1008. NumLayersInOutputLayerSet[i] may be set equal to numLAyersInIdList[output_layer_set_idx[i]] where output_layer_set_idx[i] specifies the index lsIdx of the layer set for which output_layer_flag[lsIdx][j] is present as defined in JCTVC-N1008.

Referring to FIG. 6X, the vps_sub_layer_ordering_info_present_flag[j] indicates whether the syntax separately specified for temporal sub-layers or only one syntax is specified which applies to all the temporal sub-layers. The vps_sub_layer_ordering_info_present_flag[j] equal to 1 specifies that max_vps_dec_pic_buffering_minus1[i][k][j], max_vps_num_reorder_pics[j][k], and max_vps_latency_increase_plus1[j][k] are present for i in the range 1 to vps_max_sub_layers_minus1–1, inclusive for each output layer set. The vps_sub_layer_ordering_info_present_flag[j] equal to 0 specifies that the values of max_vps_dec_pic_buffering_minus1[i][k][vps_max_sub_layers_minus1] max_vps_num_reorder_pics[i][k][vps_max_sub_layers_minus1], and max_vps_latency_increase_plus 1[i][k][vps_max_sub_layers_minus1] apply to all sub-layers for each output layer set.

max_vps_dec_pic_buffering_minus1[i][k][j] plus 1 specifies the maximum required size of the k-th layer for the CVS in the i-th output layer set in units of picture storage buffers when HighestTid is equal to j. When j is greater than 0, max_vps_dec_pic_buffering_minus1[i][k][j] shall be greater than or equal to max_vps_dec_pic_buffering_minus1[i][k][j–1]. When max_vps_dec_pic_buffering_minus1[i][k][j] is not present for j in the range of 1 to vps_max_sub_layers_minus1–1, inclusive, it is inferred to be equal to max_vps_dec_pic_buffering_minus1[i][k][vps_max_sub_layers_minus1].

max_vps_num_reorder_pics[i][j] indicates the maximum allowed number of access units containing a picture with PicOutputFlag equal to 1 that can precede any access unit that contains a picture with PicOutputFlag equal to 1 in the i-th output layer set in the CVS in decoding order and follow the access unit that contains a picture with PicOutputFlag equal to 1 in output order, and when HighestTid is equal to j. When max_vps_num_reorder_pics[i][j] is not present for j in the range of 1 to vps_max_sub_layers_minus1−1, inclusive, it is inferred to be equal to max_vps_num_reorder_pics [i][vps_max_sub_layers_minus1].

max_vps_latency_increase_plus1[i][j] not equal to 0 is used to compute the value of VpsMaxLatencyPictures[i][j], which specifies the maximum number of access units containing a picture with PicOutputFlag equal to 1 in the i-th output layer set that can precede any access unit that contains a picture with PicOutputFlag equal to 1 in the CVS in output order and follow the access unit that contains a picture with PicOutputFlag equal to 1 in decoding order when HighestTid is equal to j. When max_vps_latency_increase_plus1[i][j] is not present for j in the range of 1 to vps_max_sub_layers_minus1−1, inclusive, it is inferred to be equal to max_vps_latency_increase_plus1[i][vps_max_sub_layers_minus1].

When max_vps_latency_increase_plus1[i][j] is not equal to 0, the value of VpsMaxLatencyPictures[i][j] is specified as follows:

VpsMaxLatencyPictures[i][j]=max_vps_num_reorder_pics[i][j]+max_vps_latency_increase_plus1[i][j]−1.

When max_vps_latency_increase_plus1[i][j] is equal to 0, no corresponding limit is expressed. The value of max_vps_latency_increase_plus1[i][j] shall be in the range of 0 to $2^{32}-2$, inclusive.

Referring to FIG. 6A, an exemplary modified vps_extension is illustrated. The modified vps extension includes new syntax, namely, num_op_dpb_info_parameters and operation_point_layer_set_idx[i]. This modified vps extension may be defined in terms of the operation point which is a bitstream created from another bitstream by operation of a sub-bitstream extraction process with the another bitstream, a target highest TemporalId, and a target layer identifier list as inputs.

num_output_layer_sets specifies the number of layer sets for which output layers are specified with output_layer_set_index[i] and output_layer_flag[lsIdx][j]. When not present, the value of num_output_layer_sets is inferred to be equal to 0. A layer set describing output layers is an output layer set.

output_layer_set_idx[i] specifies the index lsIdx of the layer set for which output_layer_flag[lsIdx][j] is present.

output_layer_flag[lsIdx][j] equal to 1 specifies that the layer with nuh_layer_id equal to j is a target output layer of the lsIdx-th layer set. A value of output_layer_flag[lsIdx][j] equal to 0 specifies that the layer with nuh_layer_id equal to j is not a target output layer of the lsIdx-th layer set.

The num_op_dpb_info_parameters specifies the number of op_dpb_parameters( ) syntax structures present in the VPS extension RBSP, defined in terms of the operation point. The num_op_dpb_info_parameters decoders is in the range of 0 to vps_num_layer_sets_minus1, inclusive.

The operation_point_layer_set_idx[i] specifies the index, into the list of layer sets defined by operation points to which the i-th op_dpb_info_parameters( ) syntax structure in the VPS extension applies. The value of operation_point_layer_set_idx[i] may be in the range of 0 to vps_num_layer_sets_minus1, inclusive. For bitstream conformance the operation_point_layer_set_idx[i] is not equal to operation_point_layer_set_idx[j] for any j not equal to i.

Referring to FIG. 7A, the op_dpb_info_parameters specifies vps_max_sub_layers_minus1 [j], vps_sub_layer_ordering_info_present_flag[j], vps_max_dec_pic_buffering_minus1[j][k], vps_max_num_reorder_pics[j][k], and vps_max_latency_increase_plus1[j][k].

The vps_max_sub_layers_minus1[j] plus 1 indicates how many sub layers are included. The vps_max_sub_layers_minus1[j] plus 1 specifies the maximum number of temporal sub-layers that may be present in the CVS for layer with nuh_layer_id equal to j. The value of vps_max_sub_layers_minus1[j] is in the range of 0 to 6, inclusive.

The vps_sub_layer_ordering_info_present_flag[j] indicates whether the syntax is for one set including all layers or for each individual layer. The vps_sub_layer_ordering_info_present_flag[j] equal to 1 specifies that vps_max_dec_pic_buffering_minus1[j][k], vps_max_num_reorder_pics[j][k], and vps_max_latency_increase_plus1[j][k] are present for layer with nuh_layer_id equal to j for vps_max_sub_layers_minus1[j]+1 sub-layers. The vps_sub_layer_ordering_info_present_flag[j] equal to 0 specifies that the values of vps_max_dec_pic_buffering_minus1 [j][vps_max_sub_layers_minus1 [j]], vps_max_num_reorder_pics [j][vps_max_sub_layers_minus1 [j]], and vps_max_latency_increase_plus1[j][vps_max_sub_layers_minus1[j]] apply to all sub-layers for layer with nuh_layer_id equal to j.

The vps_max_dec_pic_buffering_minus1[j][k] plus 1 specifies the maximum required size of the decoded picture buffer for the CVS for layer with nuh_layer_id equal to j in units of picture storage buffers when HighestTid is equal to k. The value of vps_max_dec_pic_buffering_minus1[j][k] shall be in the range of 0 to MaxDpbSize−1 (as specified in subclause A.4), inclusive. When k is greater than 0, vps_max_dec_pic_buffering_minus1[j][k] shall be greater than or equal to vps_max_dec_pic_buffering_minus1[j][k−1]. When vps_max_dec_pic_buffering_minus1[j][k] is not present for k in the range of 0 to vps_max_sub_layers_minus1[j]−1, inclusive, due to vps_sub_layer_ordering_info_present_flag[j] being equal to 0, it is inferred to be equal to vps_max_dec_pic_buffering_minus1[j][vps_max_sub_layers_minus1[j]].

The vps_max_num_reorder_pics[j][k] indicates the maximum allowed number of pictures that can precede any picture in the CVS for layer with nuh_layer_id equal to j in decoding order and follow that picture in output order when HighestTid is equal to k. The value of vps_max_num_reorder_pics[j][k] shall be in the range of 0 to vps_max_dec_pic_buffering_minus1[j][k], inclusive. When k is greater than 0, vps_max_num_reorder_pics[j][k] is greater than or equal to vps_max_num_reorder_pics[j][k−1]. When vps_max_num_reorder_pics[j][k] is not present for k in the range of 0 to vps_max_sub_layers_minus1[j]−1, inclusive, due to vps_sub_layer_ordering_info_present_flag[j] being equal to 0, it is inferred to be equal to vps_max_num_reorder_pics[j][vps_max_sub_layers_minus1[j]].

The vps_max_latency_increase_plus1[j][k] not equal to 0 is used to compute the value of VpsMaxLatencyPictures[j][k], which specifies the maximum number of pictures that can precede any picture in the CVS for layer with nuh_layer_id equal to j in output order and follow that picture in decoding order when HighestTid is equal to k.

When vps_max_latency_increase_plus 1[j][k] is not equal to 0, the value of VpsMaxLatencyPictures[j][k] may be specified as follows:

VpsMaxLatencyPictures[j][k]=vps_max_num_reorder_pics[j][k]+vps_max_latency_increase_plus1[j][k]−1.

When vps_max_latency_increase_plus 1[j][k] is equal to 0, no corresponding limit is expressed.

The value of vps_max_latency_increase_plus 1[j][k] is in the range of 0 to $2^{32}-2$, inclusive. When vps_max_latency_increase_plus1[j][k] is not present for k in the range of 0 to vps_max_sub_layers_minus1[j]−1, inclusive, due to vps_sub_layer_ordering_info_present_flag[j] being equal to 0, it is inferred to be equal to vps_max_latency_increase_plus1[j][vps_max_sub_layers_minus1[j]].

The vps_max_sub_layers_minus1[id][j] plus 1 specifies the maximum number of temporal sub-layers that may be present in the CVS for layer with nuh_layer_id equal to j for the operation point associated with index id. The value of vps_max_sub_layers_minus1[id][j] shall be in the range of 0 to 6, inclusive.

The vps_sub_layer_ordering_info_present_flag[id][j] equal to 1 specifies that vps_max_dec_pic_buffering_minus1[id][j][k], vps_max_num_reorder_pics[id][j][k], and vps_max_latency_increase_plus1[id][j][k] are present for layer with nuh_layer_id equal to j for the operation point associated with index id for vps_max_sub_layers_minus1[id][j]+1 sub-layers. vps_sub_layer_ordering_info_present_flag[id][j] equal to 0 specifies that the values of vps_max_dec_pic_buffering_minus1[id][j][vps_max_sub_layers_minus1[id][j]], vps_max_num_reorder_pics[id][j][vps_max_sub_layers_minus1[id][j]], and vps_max_latency_increase_plus1[id][j][vps_max_sub_layers_minus1[id][j]] apply to all sub-layers for layer with nuh_layer_id equal to j for the operation point associated with index id.

The vps_max_dec_pic_buffering_minus1[id][j][k] plus 1 specifies the maximum required size of the decoded picture buffer for the CVS for layer with nuh_layer_id equal to j for the operation point associated with index id in units of picture storage buffers when HighestTid is equal to k. The value of vps_max_dec_pic_buffering_minus1[id][j][k] shall be in the range of 0 to MaxDpbSize−1 (as specified in subclause A.4), inclusive. When k is greater than 0, vps_max_dec_pic_buffering_minus1[id][j][k] shall be greater than or equal to vps_max_dec_pic_buffering_minus1[id][j][k−1]. When vps_max_dec_pic_buffering_minus1[id][j][k] is not present for k in the range of 0 to vps_max_sub_layers_minus1[id][j]−1, inclusive, due to vps_sub_layer_ordering_info_present_flag[id][j] being equal to 0, it is inferred to be equal to vps_max_dec_pic_buffering_minus1[id][j][vps_max_sub_layers_minus1[id][j]].

The vps_max_num_reorder_pics[id][j][k] indicates the maximum allowed number of pictures that can precede any picture in the CVS for layer with nuh_layer_id equal to j for the operation point associated with index id in decoding order and follow that picture in output order when HighestTid is equal to k. The value of vps_max_num_reorder_pics[id][j][k] shall be in the range of 0 to vps_max_dec_pic_buffering_minus1[id][j][k], inclusive. When k is greater than 0, vps_max_num_reorder_pics[id][j][k] shall be greater than or equal to vps_max_num_reorder_pics[id][j][k−1]. When vps_max_num_reorder_pics[id][j][k] is not present for k in the range of 0 to vps_max_sub_layers_minus1[id][j]−1, inclusive, due to vps_sub_layer_ordering_info_present_flag[id][j] being equal to 0, it is inferred to be equal to vps_max_num_reorder_pics[id][j][vps_max_sub_layers_minus1[id][j]].

The 'vps_max_latency_increase_plus1'[id][j][k] not equal to 0 is used to compute the value of VpsMaxLatencyPictures[id][j][k], which specifies the maximum number of pictures that can precede any picture in the CVS for layer with nuh_layer_id equal to j for the operation point associated with index id in output order and follow that picture in decoding order when HighestTid is equal to k.

When vps_max_latency_increase_plus 1[id][j][k] is not equal to 0, the value of VpsMaxLatencyPictures[id][j][k] is specified as follows:

VpsMaxLatencyPictures[id][*j*][*k*]=vps_max_num_reorder_pics[id][*j*][*k*]+vps_max_latency_increase_plus1[id][*j*][*k*]−1

When vps_max_latency_increase_plus 1[id][j][k] is equal to 0, no corresponding limit is expressed.

The value of vps_max_latency_increase_plus1[id][j][k] shall be in the range of 0 to $2^{32}-2$, inclusive. When vps_max_latency_increase_plus1[id][j][k] is not present for k in the range of 0 to vps_max_sub_layers_minus1[id][j]−1, inclusive, due to vps_sub_layer_ordering_info_present_flag[id][j] being equal to 0, it is inferred to be equal to vps_max_latency_increase_plus1[id][j][vps_max_sub_layers_minus1[id][j]].

Referring to FIG. 7B, the op_dpb_info_parameters may be further modified as shown to op_dpb_info_parameters (id,j). In this case the syntax of VPS extension may be as illustrated in FIG. 6B. The hypothetical reference decoder (HRD) is used to check bitstream and decoder conformance. Two types of bitstreams or bitstream subsets are subject to HRD conformance checking for the Joint Collaborative Team on Video Coding (JCT-VC). The first type, called a Type I bitstream, is a NAL unit stream containing only the VCL NAL units and NAL units with nal_unit_type equal to FD_NUT (filler data NAL units) for all access units in the bitstream. The second type, called a Type II bitstream, contains, in addition to the VCL NAL units and filler data NAL units for all access units in the bitstream, at least one of (a) additional non-VCL NAL units other than filler data NAL units, and (b) all leading_zero_8bits, zero_byte, start_code_prefix_one_3bytes, and trailing_zero_8bits syntax elements that form a byte stream from the NAL unit stream.

The syntax elements of non-VCL NAL units (or their default values for some of the syntax elements), required for the HRD, are specified in the semantic subclauses of clause 7, Annexes D and E.

Two types of HRD parameter sets (NAL HRD parameters and VCL HRD parameters) are used. The HRD parameter sets are signalled through the hrd_parameters( ) syntax structure, which may be part of the SPS syntax structure or the VPS syntax structure.

Multiple tests may be needed for checking the conformance of a bitstream, which is referred to as the bitstream under test. For each test, the following steps apply in the order listed:

(1) An operation point under test, denoted as TargetOp, is selected. The layer identifier list OpLayerIdList of TargetOp consists of the list of nuh_layer_id values, in increasing order of nuh_layer_id values, present in the bitstream subset associated with TargetOp, which is a subset of the nuh_layer_id values present in the bitstream under test. The OpTid of TargetOp is equal to the highest TemporalId present in the bitstream subset associated with TargetOp.

(2) TargetDecLayerIdList is set equal to OpLayerIdList of TargetOp, HighestTid is set equal to OpTid of TargetOp, and the sub-bitstream extraction process as specified in clause 10 is invoked with the bitstream under test, HighestTid, and TargetDecLayerIdList as inputs, and the output is assigned to BitstreamToDecode.

(3) The hrd_parameters( ) syntax structure and the sub_layer_hrd_parameters( ) syntax structure applicable to TargetOp are selected. If TargetDecLayerIdList contains all nuh_layer_id values present in the bitstream under test, the hrd_parameters( ) syntax structure in the active SPS (or provided through an external means not specified in this Specification) is selected. Otherwise, the hrd_parameters( ) syntax structure in the active VPS (or provided through some external means not specified in this Specification) that applies to TargetOp is selected. Within the selected hrd_parameters( ) syntax structure, if BitstreamToDecode is a Type I bitstream, the sub_layer_hrd_parameters(HighestTid) syntax structure that immediately follows the condition "if (vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if(vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8bits, zero_byte, start_code_prefix_one_3bytes, and trailing_zero_8bits syntax elements that form a byte stream from the NAL unit stream (as specified in Annex B), when present, are discarded from BitstreamToDecode, and the remaining bitstream is assigned to BitstreamToDecode.

In another case Multiple tests may be needed for checking the conformance of a bitstream, which is referred to as the bitstream under test. For each test, the following steps apply in the order listed:

(1) An output layer set under test, denoted as TargetOpLs is selected. The operation point referred in TargetOpLs by output_layer_set_idx[ ] identifies the operation point under test. The output layer identifier list OpLayerIdList of TargetOpLs consists of the list of nuh_layer_id values, in increasing order of nuh_layer_id values, present in the bitstream subset associated with TargetOp and TargetOpLs, which is a subset of the nuh_layer_id values present in the bitstream under test. The OpTid of TargetOp is equal to the highest TemporalId present in the bitstream subset associated with TargetOp.

(2) TargetDecLayerIdList is set equal to target decoded layer identifier list targetDLayerIdList for the selected output layer set TargetOpLs, HighestTid is set equal to OpTid of TargetOp, and the sub-bitstream extraction process as specified in clause 10 is invoked with the bitstream under test, HighestTid, and TargetDecLayerIdList as inputs, and the output is assigned to BitstreamToDecode.

(3) The hrd_parameters( ) syntax structure and the sub_layer_hrd_parameters( ) syntax structure applicable to TargetOp are selected. If TargetDecLayerIdList contains all nuh_layer_id values present in the bitstream under test, the hrd_parameters( ) syntax structure in the active SPS (or provided through an external means not specified in this Specification) is selected. Otherwise, the hrd_parameters( ) syntax structure in the active VPS (or provided through some external means not specified in this Specification) that applies to TargetOp is selected. Within the selected hrd_parameters( ) syntax structure, if BitstreamToDecode is a Type I bitstream, the sub_layer_hrd_parameters(HighestTid) syntax structure that immediately follows the condition "if (vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if(vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8bits, zero_byte, start_code_prefix_one_3bytes, and trailing_zero_8bits syntax elements that form a byte stream from the NAL unit stream (as specified in Annex B), when present, are discarded from BitstreamToDecode, and the remaining bitstream is assigned to BitstreamToDecode.

A conforming decoder may fulfil all requirements specified in this subclause.

(1) A decoder claiming conformance to a specific profile, tier and level shall be able to successfully decode all bitstreams that conform to the bitstream conformance requirements specified in subclause C.4, in the manner specified in Annex A, provided that all VPSs, SPSs and PPSs referred to in the VCL NAL units, and appropriate buffering period and picture timing SEI messages are conveyed to the decoder, in a timely manner, either in the bitstream (by non-VCL NAL units), or by external means not specified in this Specification.

(2) When a bitstream contains syntax elements that have values that are specified as reserved and it is specified that decoders shall ignore values of the syntax elements or NAL units containing the syntax elements having the reserved values, and the bitstream is otherwise conforming to this Specification, a conforming decoder shall decode the bitstream in the same manner as it would decode a conforming bitstream and shall ignore the syntax elements or the NAL units containing the syntax elements having the reserved values as specified.

There are two types of conformance of a decoder: output timing conformance and output order conformance.

To check conformance of a decoder, test bitstreams conforming to the claimed profile, tier and level, as specified in subclause C.4 are delivered by a hypothetical stream scheduler (HSS) both to the HRD and to the decoder under test (DUT). All cropped decoded pictures output by the HRD shall also be output by the DUT, each cropped decoded picture output by the DUT shall be a picture with PicOutputFlag equal to 1, and, for each such cropped decoded picture output by the DUT, the values of all samples that are output shall be equal to the values of the samples produced by the specified decoding process.

For output timing decoder conformance, the HSS operates as described above, with delivery schedules selected only from the subset of values of SchedSelIdx for which the bit rate and CPB size are restricted as specified in Annex A for the specified profile, tier and level, or with "interpolated" delivery schedules as specified below for which the bit rate and CPB size are restricted as specified in Annex A. The same delivery schedule is used for both the HRD and the DUT.

When the HRD parameters and the buffering period SEI messages are present with cpb_cnt_minus1[HighestTid] greater than 0, the decoder shall be capable of decoding the bitstream as delivered from the HSS operating using an "interpolated" delivery schedule specified as having peak bit rate r, CPB size c(r), and initial CPB removal delay $$(f(r) \div r)$$

as follows:

$$\alpha = (r - \text{BitRate}[\text{SchedSelIdx}-1]) + (\text{BitRate}[\text{SchedSelIdx}] - \text{BitRate}[\text{SchedSelIdx}-1]), \quad \text{(C-22)}$$

$$c(r) = \alpha * \text{CpbSize}[\text{SchedSelIdx}] + (1-\alpha) * \text{CpbSize}[\text{SchedSelIdx}-1], \quad \text{(C-23)}$$

$$f(r) = \alpha * \text{InitCpbRemovalDelay}[\text{SchedSelIdx}] * \text{BitRate}[\text{SchedSelIdx}] + (1-\alpha) * \text{InitCpbRemovalDelay}[\text{SchedSelIdx}-1] * \text{BitRate}[\text{SchedSelIdx}-1] \quad \text{(C-24)}$$

for any SchedSelIdx>0 and r such that BitRate[SchedSelIdx-1]<=r<=BitRate[SchedSelIdx] such that r and c(r) are within the limits as specified in Annex A for the maximum bit rate and buffer size for the specified profile, tier and level. The InitCpbRemovalDelay[SchedSelIdx] can be different from one buffering period to another and have to be re-calculated.

For output timing decoder conformance, an HRD as described above is used and the timing (relative to the delivery time of the first bit) of picture output is the same for both the HRD and the DUT up to a fixed delay.

For output order decoder conformance, the following applies:

(1) The HSS delivers the bitstream BitstreamToDecode to the DUT "by demand" from the DUT, meaning that the HSS delivers bits (in decoding order) only when the DUT requires more bits to proceed with its processing. This means that for this test, the coded picture buffer of the DUT could be as small as the size of the largest decoding unit.

(2) A modified HRD as described below is used, and the HSS delivers the bitstream to the HRD by one of the schedules specified in the bitstream BitstreamToDecode such that the bit rate and CPB size are restricted as specified in Annex A. The order of pictures output shall be the same for both the HRD and the DUT.

(3) The HRD CPB size is given by CpbSize[SchedSelIdx] as specified in subclause E.2.3, where SchedSelIdx and the HRD parameters are selected as specified in subclause C.1. The DPB size is given by sps_max_dec_pic_buffering_minus1[HighestTid]+1 from the active SPS (when nuh_layer_id for the current decoded picture is equal to 0) or from the active layer SPS for the value of nuh_layer_id of the current decoded picture. In some cases, if DPB information parameters are signaled in VPS extension for the selected output layer set for example as in FIG. 6X, the DPB size is given by max_vps_dec_pic_buffering_minus1[TargetOutputLayerId][currLayerId][HighestTid] when Let TargetOutputLayerId be the index to the entry in the list of output layer sets signalled in the VPS that corresponds to the set of target output layers TargetOptLayerIdList.

In other cases for example other variants in FIG. 6A, 6B in this scenario the DPB size is given by vps_max_dec_pic_buffering_minus1[HighestTid] when currLayerId is equal to 0 or is set to vps_max_dec_pic_buffering_minus1[CurrLayerId][HighestTid] for the currLayerId for the operation point under test when currLayerId is greater than 0, where currLayerId is the nuh_layer_id of the current decoded picture. Otherwise if operation point DPB information parameters op_dpb_info_parameters( ) are not present for the operation point under test, the DPB Size is given by sps_max_dec_pic_buffering_minus1[HighestTid]+1 from the active SPS (when nuh_layer_id for the current decoded picture is equal to 0) or from the active layer SPS for the value of nuh_layer_id of the current decoded picture.

In some cases, if output layer sets DPB information parameters oop_dpb_info_parameters( ) are present for the selected output layer set, The DPB size is given by vps_max_dec_pic_buffering_minus1[HighestTid] when currLayerId is equal to 0 or is set to vps_max_dec_pic_buffering_minus1[CurrLayerId][HighestTid] for the currLayerId for the selected output layer set, where currLayerId is the nuh_layer_id of the current decoded picture. Otherwise if output layer sets DPB information parameters oop_dpb_info_parameters( ) are not present for the selected output layer set, the DPB Size is given by sps_max_dec_pic_buffering_minus1[HighestTid]+1 from the active SPS (when nuh_layer_id for the current decoded picture is equal to 0) or from the active layer SPS for the value of nuh_layer_id of the current decoded picture.

The removal time from the CPB for the HRD is the final bit arrival time and decoding is immediate. The operation of the DPB of this HRD is as described in subclauses C.5.2 through C.5.2.3.

The decoded picture buffer contains picture storage buffers. The number of picture storage buffers for nuh_layer_id equal to 0 is derived from the active SPS. The number of picture storage buffers for each non-zero nuh_layer_id value is derived from the active layer SPS for that non-zero nuh_layer_id value. Each of the picture storage buffers contains a decoded picture that is marked as "used for reference" or is held for future output. The process for output and removal of pictures from the DPB as specified in subclause F.13.5.2.2 is invoked, followed by the invocation of the process for picture decoding, marking, additional bumping, and storage as specified in subclause F.13.5.2.3. The "bumping" process is specified in subclause F.13.5.2.4 and is invoked as specified in subclauses F13.5.2.2 and F13.5.2.3.

The output and removal of pictures from the DPB before the decoding of the current picture (but after parsing the slice header of the first slice of the current picture) happens instantaneously when the first decoding unit of the access unit containing the current picture is removed from the CPB and proceeds as follows.

The decoding process for RPS as specified in subclause 8.3.2 is invoked.

(1) If the current picture is an IRAP picture with NoRaslOutputFlag equal to 1 and with nuh_layer_id equal to 0 that is not picture 0, the following ordered steps are applied:
(A) The variable NoOutputOfPriorPicsFlag is derived for the decoder under test as follows:
(i) If the current picture is a CRA picture, NoOutputOfPriorPicsFlag is set equal to 1 (regardless of the value of no_output_of_prior_pics_flag).
(ii) Otherwise, if the value of pic_width_in_luma_samples, pic_height_in_luma_samples, or sps_max_dec_pic_buffering_minus1[HighestTid] derived from the active SPS is different from the value of pic_width_in_luma_samples, pic_height_in_luma_samples, or sps_max_dec_pic_buffering_minus1[HighestTid], respectively, derived from the SPS active for the preceding picture, NoOutputOfPriorPicsFlag may (but should not) be set to 1 by the decoder under test, regardless of the value of no_output_of_prior_pics_flag. Although setting NoOutputOfPriorPicsFlag equal to no_output_of_prior_pics_flag is preferred under these conditions, the decoder under test is allowed to set NoOutputOfPriorPicsFlag to 1 in this case.
(iii) Otherwise, NoOutputOfPriorPicsFlag is set equal to no_output_of_prior_pics_flag.

(B) The value of NoOutputOfPriorPicsFlag derived for the decoder under test is applied for the HRD as follows:
  (i) If NoOutputOfPriorPicsFlag is equal to 1, all picture storage buffers in the DPB are emptied without output of the pictures they contain, and the DPB fullness is set equal to 0.
  (ii) Otherwise (NoOutputOfPriorPicsFlag is equal to 0), all picture storage buffers containing a picture that is marked as "not needed for output" and "unused for reference" are emptied (without output), and all non-empty picture storage buffers in the DPB are emptied by repeatedly invoking the "bumping" process specified in subclause F.13.5.2.4, and the DPB fullness is set equal to 0.
  (iii) Otherwise (the current picture is not an IRAP picture with NoRaslOutputFlag equal to 1 and with nuh_layer_id equal to 0), all picture storage buffers containing a picture which are marked as "not needed for output" and "unused for reference" are emptied (without output). For each picture storage buffer that is emptied, the DPB fullness is decremented by one. The variable currLayerId is set equal to nuh_layer_id of the current decoded picture.

The variables MaxNumReorderPics[currLayerId][HighestTid], MaxLatencyIncreasePlus1[currLayerId][HighestTid], MaxLatencyPictures[currLayerId][HighestTid], MaxDecPicBufferingMinus1[currLayerId][HighestTid] are derived as follows:

When a coded video sequence conforming to one or more of the profiles specified in Annex A is decoded by applying the decoding process specified in clauses 2-10, MaxNumReorderPics[currLayerId][HighestTid] is set to sps_max_num_reorder_pics[HighestTid] from the active SPS, MaxLatencyIncreasePlus1[currLayerId][HighestTid] is set to sps_max_latency_increase_plus1[HighestTid] of the active SPS, MaxLatencyPictures[currLayerId][HighestTid] is set to SpsMaxLatencyPictures[HighestTid] of the active SPS, MaxDecPicBufferingMinus1[currLayerId][HighestTid] is set to sps_max_dec_pic_buffering_minus1[HighestTid] of the active SPS.

When a coded video sequence conforming to one or more of the profiles specified in Annex G or H is decoded by applying the decoding process specified in clauses 2-10, Annex F, and Annex G or H, MaxNumReorderPics[currLayerId][HighestTid] is set to max_vps_num_reorder_pics[TargetOutputLayerId][HighestTid] of the active VPS, MaxLatencyIncreasePlus1[currLayerId][HighestTid] is set to max_vps_latency_increase_plus1[TargetOutputLayerId][HighestTid] of the active VPS, MaxLatencyPictures[currLayerId][HighestTid] is set to VpsMaxLatencyPictures[TargetOutputLayerId][HighestTid] of the active VPS, MaxDecPicBufferingMinus1[currLayerId][HighestTid] is set to max_vps_dec_pic_buffering_minus1[TargetOutputLayerId][currLayerId][HighestTid] of the active VPS.

In a variant embodiment the variables MaxNumReorderPics[TargetOp][currLayerId][HighestTid], MaxLatencyIncreasePlus1[TargetOp][currLayerId][HighestTid], MaxLatencyPictures[TargetOp][currLayerId][HighestTid], MaxDecPicBufferingMinus1[TargetOp][currLayerId][HighestTid] are derived as follows based on the current operation point under test:
  (1) If operation point DPB information parameters op_dpb_info_parameters( ) are present for the operation point under test TargetOp, MaxNumReorderPics[TargetOp] [currLayerId][HighestTid] is set to vps_max_num_reorder_pics [HighestTid] when currLayerId is equal to 0 or is set to vps_max_num_reorder_pics[TargetOp][CurrLayerId] [HighestTid] for the currLayerId for the operation point under test when currLayerId is greater than 0. Otherwise if operation point DPB information parameters op_dpb_info_parameters( ) are not present for the operation point under test MaxNumReorderPics[TargetOp][currLayerId] [HighestTid] is set to sps_max_num_reorder_pics[HighestTid] from the active SPS (when currLayerId is equal to 0) or from the active layer SPS for the value of currLayerId.
  (2) If operation point DPB information parameters op_dpb_info_parameters( ) are present for the operation point under test TargetOp, MaxLatencyIncreasePlus1[TargetOp] [currLayerId][HighestTid] is set to vps_max_latency_increase_plus1[HighestTid] when currLayerId is equal to 0 or is set to vps_max_latency_increase_plus1[TargetOp][CurrLayerId][HighestTid] for the currLayerId for the operation point under test when currLayerId is greater than 0. If operation point DPB information parameters op_dpb_info_parameters( ) are present for the operation point under test, MaxLatencyPictures[TargetOp][currLayerId][HighestTid] is set to VpsMaxLatencyPictures[HighestTid] when currLayerId is equal to 0 or is set to VpsMaxLatencyPictures [TargetOp][CurrLayerId][HighestTid] for the currLayerId for the operation point under test when currLayerId is greater than 0. Otherwise if operation point DPB information parameters op_dpb_info_parameters( ) are not present for the operation point under test, MaxLatencyIncreasePlus1 [TargetOp][currLayerId][HighestTid] is set to sps_max_latency_increase_plus1[HighestTid] of the active SPS (when currLayerId is equal to 0) or the active layer SPS for the value of currLayerId and MaxLatencyPictures[TargetOp] [currLayerId][HighestTid] is set to SpsMaxLatencyPictures [HighestTid] derived from the active SPS (when currLayerId is equal to 0) or from the active layer SPS for the value of currLayerId.
  (3) If operation point DPB information parameters op_dpb_info_parameters( ) are present for the selected operation point under test TargetOp, MaxDecPicBufferingMinus1 [TargetOp][currLayerId][HighestTid] is set to vps_max_dec_pic_buffering_minus1[HighestTid] when currLayerId is equal to 0 or is set to vps_max_dec_pic_buffering_minus1 [TargetOp][CurrLayerId][HighestTid] for the currLayerId for the operation point under test when currLayerId is greater than 0. Otherwise if operation point DPB information parameters op_dpb_info_parameters( ) are not present for the operation point under test, MaxDecPicBufferingMinus1[TargetOp][currLayerId][HighestTid] is set to sps_max_dec_pic_buffering_minus1[HighestTid] from the active SPS (when currLayerId is equal to 0) or from the active layer SPS for the value of currLayerId.

When one or more of the following conditions are true, the "bumping" process specified in subclause F.13.5.2.4 is invoked repeatedly while further decrementing the DPB fullness by one for each additional picture storage buffer that is emptied, until none of the following conditions are true:
  (1) The number of access units that contain at least one picture, that is marked as "needed for output" is greater than MaxNumReorderPics[currLayerId][HighestTid].
  (2) If MaxLatencyIncreasePlus1[currLayerId][HighestTid] is not equal to 0 and there is at least one access unit that contains a picture that is marked as "needed for output" for which the associated variable PicLatencyCount is greater than or equal to MaxLatencyPictures[currLayerId][HighestTid].

(3) The number of pictures with nuh_layer_id equal to currLayerId in the associated sub-DPB is greater than or equal to MaxDecPicBufferingMinus1[currLayerId][HighestTid]+1.

The processes specified in this subclause happen instantaneously when the last decoding unit of access unit n containing the current picture is removed from the CPB.

The variable currLayerId is set equal to nuh_layer_id of the current decoded picture.

For each picture in the DPB that is marked as "needed for output" and that has a nuh_layer_id value equal to currLayerId, the associated variable PicLatencyCount[currLayerId] is set equal to PicLatencyCount[currLayerId]+1.

The current picture is considered as decoded after the last decoding unit of the picture is decoded. The current decoded picture is stored in an empty picture storage buffer in the DPB, and the following applies:

(A) If the current decoded picture has PicOutputFlag equal to 1, it is marked as "needed for output" and its associated variable PicLatencyCount[currLayerId] is set equal to 0.

(B) Otherwise (the current decoded picture has PicOutputFlag equal to 0), it is marked as "not needed for output".

The current decoded picture is marked as "used for short-term reference".

When one or more of the following conditions are true, the "bumping" process specified in subclause F.13.5.2.4 is invoked repeatedly until none of the following conditions are true:

(A) The number of number of access units that contain at least one picture that is marked as "needed for output" is greater than MaxNumReorderPics[currLayerId][HighestTid].

(B) MaxLatencyIncreasePlus1[currLayerId][HighestTid] is not equal to 0 and there is at least one access unit containing a picture that is marked as "needed for output" for which the associated variable PicLatencyCount[currLayerId] that is greater than or equal to MaxLatencyPictures[currLayerId][HighestTid].

In a variant embodiment when one or more of the following conditions are true, the "bumping" process specified in subclause F.13.5.2.4 is invoked repeatedly while further decrementing the DPB fullness by one for each additional picture storage buffer that is emptied, until none of the following conditions are true:

(1) The number of pictures with nuh_layer_id equal to currLayerId in the DPB that are marked as "needed for output" is greater than MaxNumReorderPics[TargetOp][CurrLayerId][HighestTid].

(2) If MaxLatencyIncreasePlus1[TargetOp][CurrLayerId][HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[TargetOp] [CurrLayerId][HighestTid].

(3) The number of pictures with nuh_layer_id equal to currLayerId in the DPB is greater than or equal to MaxDecPicBufferingMinus1[TargetOp] [CurrLayerId][HighestTid]+1.

The processes specified in this subclause happen instantaneously when the last decoding unit of access unit n containing the current picture is removed from the CPB.

The variable currLayerId is set equal to nuh_layer_id of the current decoded picture.

For each picture in the DPB that is marked as "needed for output" and that has a nuh_layer_id value equal to currLayerId, the associated variable PicLatencyCount[currLayerId] is set equal to PicLatencyCount[currLayerId]+1.

The current picture is considered as decoded after the last decoding unit of the picture is decoded. The current decoded picture is stored in an empty picture storage buffer in the DPB, and the following applies:

(A) If the current decoded picture has PicOutputFlag equal to 1, it is marked as "needed for output" and its associated variable PicLatencyCount[currLayerId] is set equal to 0.

(B) Otherwise (the current decoded picture has PicOutputFlag equal to 0), it is marked as "not needed for output".

The current decoded picture is marked as "used for short-term reference".

When one or more of the following conditions are true, the "bumping" process specified in subclause F.13.5.2.4 is invoked repeatedly until none of the following conditions are true.

(A) The number of pictures with nuh_layer_id equal to currLayerId in the DPB that are marked as "needed for output" is greater than MaxNumReorderPics[TargetOp][CurrLayerId][HighestTid].

(B) MaxLatencyIncreasePlus1[TargetOp][CurrLayerId][HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[TargetOp] [CurrLayerId][HighestTid].

In other case the variables MaxNumReorderPics[currLayerId][HighestTid], MaxLatencyIncreasePlus1[currLayerId][HighestTid], MaxLatencyPictures[currLayerId][HighestTid], MaxDecPicBufferingMinus1[currLayerId][HighestTid] may be derived as follows:

(1) If operation point DPB information parameters op_dpb_info_parameters( ) are present for the operation point under test, MaxNumReorderPics[currLayerId][HighestTid] is set to vps_max_num_reorder_pics[HighestTid] when currLayerId is equal to 0 or is set to vps_max_num_reorder_pics[CurrLayerId][HighestTid] for the currLayerId for the operation point under test when currLayerId is greater than 0. Otherwise if operation point DPB information parameters op_dpb_info_parameters( ) are not present for the operation point under test MaxNumReorderPics[currLayerId][HighestTid] is set to sps_max_num_reorder_pics[HighestTid] from the active SPS (when currLayerId is equal to 0) or from the active layer SPS for the value of currLayerId.

(2) If operation point DPB information parameters op_dpb_info_parameters( ) are present for the operation point under test, MaxLatencyIncreasePlus1[currLayerId][HighestTid] is set to vps_max_latency_increase_plus1[HighestTid] when currLayerId is equal to 0 or is set to vps_max_latency_increase_plus1[CurrLayerId][HighestTid] for the currLayerId for the operation point under test when currLayerId is greater than 0. If operation point DPB information parameters op_dpb_info_parameters( ) are present for the operation point under test, MaxLatencyPictures[currLayerId][HighestTid] is set to VpsMaxLatencyPictures[HighestTid] when currLayerId is equal to 0 or is set to VpsMaxLatencyPictures[CurrLayerId][HighestTid] for the currLayerId for the operation point under test when currLayerId is greater than 0. Otherwise if operation point DPB information parameters op_dpb_info_parameters( ) are not present for the for the operation point under test, MaxLatencyIncreasePlus1[currLayerId][HighestTid] is set to sps_max_latency_increase_plus1[HighestTid] of the active SPS (when currLayerId is equal to 0) or the active layer SPS for the value of currLayerId and MaxLatencyPictures[currLayerId][HighestTid] is set to SpsMaxLatencyPictures[HighestTid] derived from the active SPS (when currLayerId is equal to 0) or from the active layer SPS for the value of currLayerId.

(3) If operation point DPB information parameters op_dpb_info_parameters( ) are present for the selected operation point under test, MaxDecPicBufferingMinus1[currLayerId][HighestTid] is set to vps_max_dec_pic_buffering_minus1[HighestTid] when currLayerId is equal to 0 or is set to vps_max_dec_pic_buffering_minus1[CurrLayerId][HighestTid] for the currLayerId for the operation point under test when currLayerId is greater than 0. Otherwise if operation point DPB information parameters op_dpb_info_parameters( ) are not present for the operation point under test, MaxDecPicBufferingMinus1[currLayerId][HighestTid] is set to sps_max_dec_pic_buffering_minus1[HighestTid] from the active SPS (when currLayerId is equal to 0) or from the active layer SPS for the value of currLayerId.

When one or more of the following conditions are true, the "bumping" process specified in subclause F.13.5.2.4 is invoked repeatedly while further decrementing the DPB fullness by one for each additional picture storage buffer that is emptied, until none of the following conditions are true:

(1) The number of pictures with nuh_layer_id equal to currLayerId in the DPB that are marked as "needed for output" is greater than MaxNumReorderPics[CurrLayerId][HighestTid].

(2) If MaxLatencyIncreasePlus1[CurrLayerId][HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[CurrLayerId][HighestTid].

(3) The number of pictures with nuh_layer_id equal to currLayerId in the DPB is greater than or equal to MaxDecPicBuffering[CurrLayerId][HighestTid].

The processes specified in this subclause happen instantaneously when the last decoding unit of access unit n containing the current picture is removed from the CPB.

The variable currLayerId is set equal to nuh_layer_id of the current decoded picture.

For each picture in the DPB that is marked as "needed for output" and that has a nuh_layer_id value equal to currLayerId, the associated variable PicLatencyCount[currLayerId] is set equal to PicLatencyCount[currLayerId]+1.

The current picture is considered as decoded after the last decoding unit of the picture is decoded. The current decoded picture is stored in an empty picture storage buffer in the DPB, and the following applies:

(A) If the current decoded picture has PicOutputFlag equal to 1, it is marked as "needed for output" and its associated variable PicLatencyCount[currLayerId] is set equal to 0.

(B) Otherwise (the current decoded picture has PicOutputFlag equal to 0), it is marked as "not needed for output".

The current decoded picture is marked as "used for short-term reference".

When one or more of the following conditions are true, the "bumping" process specified in subclause F.13.5.2.4 is invoked repeatedly until none of the following conditions are true.

(A) The number of pictures with nuh_layer_id equal to currLayerId in the DPB that are marked as "needed for output" is greater than MaxNumReorderPics[CurrLayerId][HighestTid].

(B) MaxLatencyIncreasePlus1[CurrLayerId][HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[CurrLayerId][HighestTid].

The "bumping" process consists of the following ordered steps:

(A) The pictures that are first for output are selected as the ones having the smallest value of PicOrderCntVal of all pictures in the DPB marked as "needed for output".

(B) These pictures are cropped, using the conformance cropping window specified in the active SPS for the picture with nuh_layer_id equal to 0 or in the active layer SPS for a nuh_layer_id value equal to that of the picture, the cropped pictures are output in ascending order of nuh_layer_id, and the pictures are marked as "not needed for output".

(C) Each picture storage buffer that contains a picture marked as "unused for reference" and that included one of the pictures that was cropped and output is emptied.

The VPS Extension may have additional modifications, if desired.

Referring to FIG. 8, an additional modification may include the DPB parameters being sent in the VPS extension for output layer sets instead of for operation points, where the oops dpb_info_parameters(j) are illustrated in FIG. 9.

The num_dpb_info_parameters specifies the number of oop_dpb_parameters( ) syntax structures present in the VPS extension RBSP. num_dpb_info_parameters decoders shall be in the range of 0 to num_output_layer_sets, inclusive.

The output_point_layer_set_idx[i] specifies the index, into the list of target output layer sets to which the i-th oop_dpb_info_parameters( ) syntax structure in the VPS extension applies.

The value of output_point_layer_set_idx[i] should be in the range of 0 to num_output_layer_sets, inclusive. It is requirement of bitstream conformance that output_point_layer_set_idx[i] shall not be equal to output_point_layer_set_idx[j] for any j not equal to i.

Referring to FIG. 10, the oop_dpb_info_parameters(c) may be further modified, where the syntax in the VPS extension may be as illustrated in FIG. 11.

Referring to FIG. 12, the oop_dpb_info_parameters(c) may be further modified, where the syntax in the VPS extension may be as illustrated in FIG. 13 or FIG. 14.

An exemplary alternative for the syntax in VPS extension is that
    for(j=0; j<=vps_max_layer_id; j++)
        oop_dpb_info_parameters(j)
may be changed to
    for(j=0; j<=vps_max_layer_minus1; j++)
        oop_dpb_info_parameters(j)

The vps_max_layer_id specifies the maximum allowed value of nuh_layer_id of all NAL units in the CVS. The vps_max_layers_minus1, specifies the maximum number of layers that may be present in the CVS, wherein a layer may e.g. be a spatial scalable layer, a quality scalable layer, a texture view or a depth view.

Another exemplary alternative for the syntax in VPS extension is that
    for(j=0; j<=vps_max_layer_id; j++)
        oop_dpb_info_parameters(j)
may be changed to
    for(j=0; j<numOutputLayers; j++)
        oop_dpb_info_parameters(j)
where numOutputLayers for the selected output_layer_set_index oplsIdx is derived as:

```
for(k=0,    numOutputLayers=0;k<=vps_max_layer_id;
    k++)
    if(output_layer_flag[opLsIdx][k])
        targetOpLayerIdList [numOutputLayers++]=layer_id_
            in_nuh[k].
```
Another exemplary alternative for the syntax in VPS extension is that
```
for(j=0; j<=vps_max_layer_id; j++)
    oop_dpb_info_parameters(j)
```
may be changed to
```
for(j=0; j<numDecodedLayers; j++)
    oop_dpb_info_parameters(j)
```
where numOutputLayers for the selected oplsIdx is derived as:
```
for(k=0,    numOutputLayers=0;k<=vps_max_layer_id;
    k++)
    if(output_layer_flag[opLsIdx][k])
        targetOpLayerIdList [numOutputLayers++]=layer_id_
            in_nuh[k].
```
Then a target decoded layer identifier list targetDLayerIdList and numDecodedLayers for the selected oplsIdx is derived as:

```
for(m=0, numDecodedLayers=0;m< numOutputLayers;m++) {
for(n=0;n<NumDirectRefLayers[LayerIdInVps[targetOpLayerIdList[m]]];
n++) {
    rLid=RefLayerId[LayerIdInVps[targetOpLayerIdList[m]]][n]
    if(rLid not included in targetDLayerIdList[0,...,
numDecodedLayers])
        targetDLayerIdList[numDecodedLayers++]=rLId;
    }
}
```

In one embodiment an additional flag maybe signalled to indicate if oop_dpb_information_parameters are signalled for the particular layer as follows:

```
for( j = 0; j <= vps_max_layer_id; j++ ) {
    vps_layer_info_present_flag[j]           u(1)
    if(vps_layer info_present_flag)
        oop_dpb_info_parameters(j)
}
```

The vps_layer_info_present_flag[j] equal to 1 specifies that oop_dpb_info_parameters are present for the j'th layer for the particular output layer set. vps_layer_info_present_flag[j] equal to 0 specifies that oop_dpb_info_parameters are not present for the j'th layer for the particular output layer set.

In another embodiment num_dpb_info_parameters decoders shall be in the range of 0 to 1024, inclusive. In yet another embodiment a different fixed number could be used in place of 1024.

In an alternative embodiment output_point_layer_set_idx [i] is in the range of 0 to 1023, inclusive.

Referring to FIG. 15, another modified VPS extension and layer_dpb_info(i) may be used if the DPB parameters are sent in the VPS extension for each layer independently of output layer sets and operation points.

Referring to FIG. 16, a modified layer_dpb_info(i) may be used where the syntax element vps_max_sub_layer_minus1 signaled from VPS is used for all the layers and is not separately signalled in oop_dpb_info_parameters(id)/op_dpb_info_parameters(id).

Referring to FIG. 1 as mentioned previously the decoded picture buffer (DPB) 122 may include separately identified and managed picture buffers for decoded pictures having different characteristics. For example, the decoded picture buffer (DPB) 122 may include separately identified and managed picture buffers for decoded pictures with different resolutions, different bit-depths and/or different color chromaticity. In this case there may be a separate DPB for each layer or some layers who have the same picture characteristics (e.g. resolution, bit-depth, chromaticity, etc.) may share a DPB. In this case there will be different DPBs for different picture characteristics such as resolution, bit-depth, chromaticity etc. Based on the application needs in some case a separate DPB for each layer may be beneficial, e.g. in terms of simplicity of DPB book-keeping and DPB operation. Such a DPB can be termed layer-wise DPB. On the other hand for some other applications a shared DPB where layers with the same picture characteristics share a DPB may be beneficial. Such a shared DPB based on picture characteristics may be termed a picture characteristics based shared DPB. As a result it may be advantageous to support both the layer-wise DPB and picture characteristics based shared DPB operation.

Typically a picture characteristics based shared DPB requires specifying additional information regarding number of shared DPBs, their size, resolution, bit-depth, picture characteristics, etc. These parameters could be termed shared DPB information parameters (e.g. shared_dpb_info_parameters( )), In a preferred embodiment a flag may be signaled in the bitstream to indicate that shared DPB information parameters are signaled. An example syntax for this is shown as follows:

```
shared_dpb_info_present_flag                 u(1)
    if(shared_dpb_info_present_flag)
        shared_dpb_info_parameters(j)
}
``` shared_dpb_info_present_flag equal to 1 specifies that shared DPB information parameters are present and the DPB may operate as shared DPB or layer-wise separate DPB for each layer. shared_dpb_info_present_flag equal to 0 specifies that shared DPB information parameters are not present and the DPB operates as layer-wise separate DPB for each layer. When shared_dpb_info_present_flag is not present, its value is inferred to be equal to 0.

The shared_dpb_info_present_flag may be signaled in a parameter set such as video parameter set (VPS) and/or sequence parameter set (sps) and/or picture parameter set (pps) and/or slice segment header and/or in any other normative part of the bitstream. In a preferred embodiment the shared_dpb_info_present_flag may be signaled in hrd_parameters( ). hrd_parameters( ) are described in JCTVC-L1003, JCTVC-N1008, and JCT3V-E1004.

In one case when shared_dpb_info_present_flag in the selected hrd_parameters( ) syntax structure is equal to 1, the DPB can is scheduled to operate either at operate as shared DPB in which case a variable SharedDPBFlag is set equal to 1 or as layer-wise separate DPB for each layer in which case the variable SharedDPBFlag is set equal to 0.

A variable SharedDPBPreferredFlag may be either specified by external means, or when not specified by external means, may be set equal to 0.

When the value of the variable SharedDPBFlag has not been set by step described above based on the shared_dpb_info_present_flag in hrd_parameters( ), it may be derived as follows:

SharedDPBFlag=shared_dpb_info_present_flag && SharedDPBPreferredFlag

In other case the variable SharedDPBFlag may be set based on some other logical combination (.e.g OR, NOR, XOR, AND, NAND, NOT etc.) of the shared_dpb_info_present_flag and/or SharedDPBPreferredFlag.

If SharedDPBFlag is equal to 0, each layer has its own separate DPB and the DPB of each layer operates deparately and independently without sharing of DPBs across the layers. Otherwise the DPB operates as a shared DPB where layers which have the same picture characteristics such as resolution, bit-depth, chromaticity, etc. share a common DPB.

In JCTVC-O1008 and JCT3V-F1004 the DPB (e.g., decoded picture buffer) operation is defined based on parameters signaled in the Video Parameter Set (VPS) and the Sequence Parameter Set (SPS). The size of the DPB is signaled in a dpb_size( ) syntax structure (e.g., dpb_size( )), illustrated below. The dpb_size( ) syntax structure also signals various DPB parameters for the number of output layer sets (e.g., NumOutputLayerSets) for the number of temporal sub-layers (e.g., vps_max_sub_layers_minus1) for the number of sub-dpbs (e.g., NumSubDpbs[i]) and corresponding flags.

```
dpb_size( ) {
    for( i = 1; i < NumOutputLayerSets; i++ ) {
        sub_layer_flag_info_present_flag[ i ]                              u(1)
        for( j = 0; j <= vps_max_sub_layers_minus1; j++ ) {
            if( j > 0 && sub_layer_flag_info_present_flag[ i ] )
                sub_layer_dpb_info_present_flag[ i ][ j ]                   u(1)
            if( sub_layer_dpb_info_present_flag[ i ][ j ] ) {
                for( k = 0; k < NumSubDpbs[ i ]; k++ )
                    max_vps_dec_pic_buffering_minus1[ i ][ k ][ j ]          ue(v)
                max_vps_num_reorder_pics[ i ][ j ]                          ue(v)
                max_vps_latency_increase_plus1[ i ][ j ]                    ue(v)
            }
        }
    }
}
```

Additionally, in JCTVC-O1008 and JCT3V-F1004 information regarding the maximum number of temporal sub-layers that may be present in the CVS (e.g., coded video sequence) for each layer is conditionally signalled in the VPS extension with the syntax elements sub_layers_vps_max_minus1[i] as shown below.

| vps_extension( ) { | Descriptor |
|---|---|
| avc_base_layer_flag | u(1) |
| ... | |
| vps_sub_layers_max_minus1_present_flag | u(1) |
| if( vps_sub_layers_max_minus1_present_flag ) | |
| for( i = 0; i <= MaxLayersMinus1; i++ ) | |
| sub_layers_vps_max_minus1[ i ] | u(3) |
| ... | |
| } | |

Or as shown below.

| vps_extension( ) { |
|---|
| avc_base_layer_flag |
| ... |
| vps_sub_layers_max_minus1_present_flag |
| if( vps_sub_layers_max_minus1_present_flag ) |
| for( i = 0; i <= MaxLayersMinus1; i++ ) |
| sub_layers_vps_max_minus1[ i ] |
| ... |
| } |

'The vps_sub_layers_max_minus1_present_flag' equal to 1 specifies that the syntax elements sub_layers_vps_max_minus1[i] are present. vps_sub_layers_max_minus1_present_flag equal to 0 specifies that the syntax elements sub_layers_vps_max_minus1[i] are not present.

'The sub_layers_vps_max_minus1'[i] plus 1 specifies the maximum number of temporal sub-layers that may be present in the CVS for the layer with nuh_layer_id equal to layer_id_in_nuh[i]. The value of sub_layers_vps_max_minus1[i] shall be in the range of 0 to vps_max_sub_layers_minus1, inclusive. When not present, sub_layers_vps_max_minus1[i] is inferred to be equal to vps_max_sub_layers_minus1.

'vps_max_sub_layers_minus1' may be signaled in VPS as shown below.

| video_parameter_set_rbsp( ) { | Descriptor |
|---|---|
| vps_video_parameter_set_id | u(4) |
| ... | |
| vps_max_sub_layers_minus1 | u(3) |
| ... | |
| } | |

Or as shown below.

| video_parameter_set_rbsp( ) { |
|---|
| vps_video_parameter_set_id |
| ... |
| vps_max_sub_layers_minus1 |
| ... |
| } | vps_max_sub_layers_minus1 plus 1 may specify the maximum number of temporal sub-layers that may be present in each CVS referring to the VPS. The value of vps_max_sub_layers_minus1 may be in the range of 0 to 6, inclusive.

'vps_video_parameter_set_id' identifies the VPS for reference by other syntax elements.

In some video encoding schemes, there may be cases where different layers of SHVC may have different frame rates. For example, layer 0 may have a frame rate of 30 hertz, layer 1 may have a frame rate of 60 hertz, layer 2 may have a frame rate of 120 hertz, and layer 3 may have a frame rate of 240 hertz. In such cases, a layer with a higher frame rate (e.g., layer 3) may have a higher value of the maximum temporal sub-layers (e.g., sub_layers_vps_max_minus1[i])

compared to a layer with a lower frame rate (e.g., layer 1). For a particular output layer set when operating with sub-DPBs which are layer specific, it is desirable to signal and/or constrain max_vps_dec_pic_buffering_minus1[ ][ ][ ] based upon the maximum number of temporal sub-layers in a layer set.

By way of example a bitstream may include 5 layers, namely, layer 0, layer 1, layer 2, layer 3, and layer 4. A first layer set may include layers 0, 1; a second layer set may include 0, 1, 2; a third layer set may include 0, 1, 3. By way of example, for each layer set the syntax may signal which layers are output layers of the set referred to as an output layer set.

In a first embodiment, it is desirable to signal the max_vps_dec_pic_buffering_minus1 parameters for an output layer set for sub-DPBs only up to the maximum temporal sub-layers in the corresponding layer set. Otherwise, without this modification parameters for max_vps_dec_pic_buffering_minus1 for temporal sub-layers from this maximum temporal sub-layers up to vps_max_sub_layers_minus1 for such layer sets are meaningless as the layer set does not include those number of temporal sub-layers.

In a second embodiment, it is desirable to derive a list of maximum temporal sub-layers for each layer in a layer set corresponding to each signaled output layer set. For each output layer set for each sub-DPB, max_vps_dec_pic_buffering_minus1 parameters may be constrained considering the above derived list of maximum temporal sub-layers. This constraint permits improved DPB operation for each layer in the layer set considering the maximum temporal sub-layers in the layer. This constraint also makes the signaled parameters more meaningful and not incorrect when the maximum number of temporal sub-layers for a layer set corresponding to an output layer set is less than vps_max_sub_layers_minus1.

With regard to the first embodiment, above, a variable MaxSublayersLayersetMinus1[i] may be derived as follows:

```
for( i = 1; i < NumOutputLayerSets; i++ ) {
    olsIdx[ i ] = output_layer_set_idx_minus1[ i ]+1;
    for( k = 0, MaxSublayersLayersetMinus1[ i ]=0; k < NumLayersetLayerIdList[ i ]; k++ ) {
        lid[ i ][ k ] = LayerSetLayerIdList[ olsIdx[ i ] ][ k ];
        MaxSublayersLayersetMinus1[ i ] =Max(MaxSublayersLayersetMinus1[ i ],
        sub_layers_vps_max_minus1[ LayerIdxInVps[ lid[ i ][ k ] ] ]);
    }
}
``` where $$\text{Max}(x, y) = \begin{cases} x; x >= y \\ y; x < y \end{cases}.$$

The max_vps_dec_pic_buffering_minus1 parameters for an output layer set for subDPBs are signalled only up to the maximum temporal sub-layers in the corresponding layer set, i.e. only until MaxSublayersLayersetMinus1[i]. The dpb_size( ) syntax structure (e.g., dpb_size( )), illustrated below, may be modified to incorporate the MaxSublayersLayersetMinus1[i], so that the signaling is related to the maximum temporal sub-layers in the corresponding layer set.

'sub_layer_flag_info_present_flag'[i] equal to 1 may specify that sub_layer_dpb_info_present_flag[i][j] is present for i in the range of 1 to MaxSublayersLayersetMinus1 [i], inclusive. sub_layer_flag_info_present_flag[i] equal to 0 may specify that, for each value of j greater than 0, sub_layer_dpb_info_present_flag[i][j] is not present and the value is inferred to be equal to 0.

'sub_layer_dpb_info_present_flag'[i][j] equal to 1 may specify that max_vps_dec_pic_buffering_minus1[i][k][j] is present for k in the range of 0 to NumSubDpbs[i]−1, inclusive, for the j-th sub-layer, and max_vps_num_reorder_pics[i][j] and max_vps_latency_increase_plus1[i][j] are present for the j-th sub-layer. sub_layer_dpb_info_present_flag[i][j] equal to 0 may specify that the values of max_vps_dec_pic_buffering_minus1[i][k][j] are equal to max_vps_dec_pic_buffering_minus1[i][k][j−1] for k in the range of 0 to NumSubDpbs[i]−1, inclusive, and that the values max_vps_num_reorder_pics[i][j] and max_vps_latency_increase_plus1[i][j] are set equal to max_vps_num_reorder_pics[i][j−1] and max_vps_latency_increase_plus 1[i][j−1], respectively. The value of sub_layer_dpb_info_present_flag [i][0] for any possible value of i is inferred to be equal to 1.

'max_vps_dec_pic_buffering_minus1'[i][k][j] plus 1 may specify the maximum required size of the k-th sub-DPB for the CVS in the i-th output layer set in units of picture storage buffers when HighestTid is equal to j. When j is greater than 0, max_vps_dec_pic_buffering_minus1[i][k][j] shall be greater than or equal to max_vps_dec_pic_buffering_minus1[i][k][j−1]. When max_vps_dec_pic_buffering_minus1[i][k][j] is not present for j in the range of 1 to MaxSublayersLayersetMinus1[i], inclusive, it is inferred to be equal to max_vps_dec_pic_buffering_minus1[i][k][j−1].

'max_vps_num_reorder_pics'[i][j] may specify, when HighestTid is equal to j, the maximum allowed number of access units containing a picture with PicOutputFlag equal to 1 that can precede any access unit auA that contains a picture with PicOutputFlag equal to 1 in the i-th output layer set in the CVS in decoding order and follow the access unit auA that contains a picture with PicOutputFlag equal to 1 in output order. When max_vps_num_reorder_pics[i][j] is not present for j in the range of 1 to MaxSublayersLayersetMinus1[i], inclusive, due to sub_layer_dpb_info_present_flag [i][j] being equal to 0, it is inferred to be equal to max_vps_num_reorder_pics[i][j−1].

'max_vps_latency_increase_plus1'[i][j] not equal to 0 is used to compute the value of VpsMaxLatencyPictures[i][j], which, when HighestTid is equal to j, may specify the maximum number of access units containing a picture with PicOutputFlag equal to 1 in the i-th output layer set that can precede any access unit auA that contains a picture with PicOutputFlag equal to 1 in the CVS in output order and follow the access unit auA that contains a picture with PicOutputFlag equal to 1 in decoding order. When max_vps_latency_increase_plus1[i][j] is not present for j in the range of 1 to MaxSublayersLayersetMinus1[i], inclusive, due to sub_layer_dpb_info_present_flag[i][j] being equal to 0, it is inferred to be equal to max_vps_latency_increase_plus1[i][j−1].

When max_vps_latency_increase_plus1[i][j] is not equal to 0, the value of VpsMaxLatencyPictures[i][j] is specified as follows:

VpsMaxLatencyPictures[*i*][*j*]=max_vps_num_reorder_pics[*i*][*j*]+max_vps_latency_increase_plus1[*i*][*j*]−1     (F-4)

When max_vps_latency_increase_plus1[i][j] is equal to 0, no corresponding limit is expressed. The value of max_vps_latency_increase_plus1[i][j] shall be in the range of 0 to $2^{32}-2$, inclusive.

In another embodiment the following may apply.

'sub_layer_flag_info_present_flag'[i] equal to 1 may specify that sub_layer_dpb_info_present_flag[i][j] is present for i in the range of 1 to MaxSublayersLayersetMinus1[i], inclusive. sub_layer_flag_info_present_flag[i] equal to 0 may specify that, for each value of j greater than 0, sub_layer_dpb_info_present_flag[i][j] is not present and the value is inferred to be equal to 0.

'sub_layer_dpb_info_present_flag'[i][j] equal to 1 may specify that max_vps_dec_pic_buffering_minus1[i][k][j] is present for k in the range of 0 to NumSubDpbs[i]−1, inclusive, for the j-th sub-layer, and max_vps_num_reorder_pics[i][j] and max_vps_latency_increase_plus1[i][j] are present for the j-th sub-layer. sub_layer_dpb_info_present_flag[i][j] equal to 0 may specify that the values of max_vps_dec_pic_buffering_minus1[i][k][j] are equal to max_vps_dec_pic_buffering_minus1[i][k][j−1] for k in the range of 0 to NumSubDpbs[i]−1, inclusive, and that the values max_vps_num_reorder_pics[i][j] and max_vps_latency_increase_plus1[i][j] are set equal to max_vps_num_reorder_pics[i][j−1] and max_vps_latency_increase_plus 1[i][j−1], respectively. The value of sub_layer_dpb_info_present_flag[i][0] for any possible value of i is inferred to be equal to 1.

'max_vps_dec_pic_buffering_minus1'[i][k][j] plus 1 may specify the maximum required size of the k-th sub-DPB for the CVS in the i-th output layer set in units of picture storage buffers when HighestTid is equal to j. When j is greater than 0, max_vps_dec_pic_buffering_minus1[i][k][j] shall be greater than or equal to max_vps_dec_pic_buffering_minus1[i][k][j−1]. When max_vps_dec_pic_buffering_minus1[i][k][j] is not present for j in the range of 1 to MaxSublayersLayersetMinus1[i]−1, inclusive, it is inferred to be equal to max_vps_dec_pic_buffering_minus1[i][k][j−1].

'max_vps_num_reorder_pics'[i][j] may specify, when HighestTid is equal to j, the maximum allowed number of access units containing a picture with PicOutputFlag equal to 1 that can precede any access unit auA that contains a picture with PicOutputFlag equal to 1 in the i-th output layer set in the CVS in decoding order and follow the access unit auA that contains a picture with PicOutputFlag equal to 1 in output order. When max_vps_num_reorder_pics[i][j] is not present for j in the range of 1 to MaxSublayersLayersetMinus1[i]−1, inclusive, due to sub_layer_dpb_info_present_flag[i][j] being equal to 0, it is inferred to be equal to max_vps_num_reorder_pics[i][j−1].

'max_vps_latency_increase_plus1'[i][j] not equal to 0 is used to compute the value of VpsMaxLatencyPictures[i][j], which, when HighestTid is equal to j, may specify the maximum number of access units containing a picture with PicOutputFlag equal to 1 in the i-th output layer set that can precede any access unit auA that contains a picture with PicOutputFlag equal to 1 in the CVS in output order and follow the access unit auA that contains a picture with PicOutputFlag equal to 1 in decoding order. When max_vps_latency_increase_plus1[i][j] is not present for j in the range of 1 to MaxSublayersLayersetMinus1[i]−1, inclusive, due to sub_layer_dpb_info_present_flag[i][j] being equal to 0, it is inferred to be equal to max_vps_latency_increase_plus1[i][j−1].

When max_vps_latency_increase_plus1[i][j] is not equal to 0, the value of VpsMaxLatencyPictures[i][j] is may be specified as follows:

VpsMaxLatencyPictures[*i*][*j*]=max_vps_num_reorder_pics[*i*][*j*]+max_vps_latency_increase_plus1[*i*][*j*]−1     (F-4)

When max_vps_latency_increase_plus1[i][j] is equal to 0, no corresponding limit is expressed. The value of max_vps_latency_increase_plus1[i][j] shall be in the range of 0 to $2^{32}-2$, inclusive.

```
dpb_size( ) {
    for( i = 1; i < NumOutputLayerSets; i++ ) {
        sub_layer_flag_info_present_flag[ i ]                             u(1)
        for( j = 0; j <= MaxSublayersLayersetMinus1[i]; j++ ) {
            if( j > 0 && sub_layer_flag_info_present_flag[ i ] )
                sub_layer_dpb_info_present_flag[ i ][ j ]                 u(1)
            if( sub_layer_dpb_info_present_flag[ i ][ j ] ) {
                for( k = 0; k < NumSubDpbs[ i ]; k++ )
                    max_vps_dec_pic_buffering_minus1[ i ][ k ][ j ]       ue(v)
                max_vps_num_reorder_pics[ i ][ j ]                        ue(v)
                max_vps_latency_increase_plus1[ i ][ j ]                  ue(v)
            }
        }
    }
}
```

With regard to the first embodiment, above, the variable MaxSublayersLayersetMinus1[i] may alternatively be derived as follows:

```
for( i = 1; i < NumOutputLayerSets; i++ ) {
    olsIdx[ i ] == output_layer_set_idx_minus1[ i ]+1;
    for( k = 0, MaxSublayersLayersetMinus1[ i ]=0; k < NumLayersetLayerIdList[ i ];
        k++ ) {
            lid = LayerSetLayerIdList[ olsIdx[ i ] ][ k ];
            MaxSublayersLayersetMinus1[ i ] =Max(MaxSublayersLayersetMinus1[ i ],
            sub_layers_vps_max_minus1[ LayerIdxInVps[ lid ] ]);
    }
}
``` where $$\text{Max}(x, y) = \begin{cases} x; & x >= y \\ y; & x < y \end{cases}.$$

With regard to the first embodiment, above, the variable MaxSublayersLayersetMinus1[i] may be derived within the dpb_size( ) syntax structure (e.g., dpb_size( )), illustrated below, so that the signaling is related to the maximum temporal sub-layers in the corresponding layer set.

```
dpb_size( ) {
    for( i = 1; i < NumOutputLayerSets; i++ ) {
        olsIdx[ i ] = output_layer_set_idx_minus1[ i ]+1;
        for( k = 0, MaxSublayersLayersetMinus1[ i ]=0; k <
NumLayersetLayerIdList[ i ]; k++ ) {
            lid[ i ][ k ] = LayerSetLayerIdList[ olsIdx[ i ] ][ k ];
            MaxSublayersLayersetMinus1[ i ]
            =Max(MaxSublayersLayersetMinus1[ i ],
            sub_layers_vps_max_minus1
            [ LayerIdxInVps[ lid[ i ][ k ] ] ]);
        }
        sub_layer_flag_info_present_flag[ i ]                    u(1)
        for( j = 0; j <= MaxSublayersLayersetMinus1[i]; j++ ) {
            if( j > 0 && sub_layer_flag_info_present_flag[ i ] )
                sub_layer_dpb_info_present_flag[ i ][ j ]        u(1)
            if( sub_layer_dpb_info_present_flag[ i ][ j ] ) {
                for( k = 0; k < NumSubDpbs[ i ]; k++ )
                    max_vps_dec_pic_buffering_minus1[ i ][ k ][ j ]  ue(v)
                max_vps_num_reorder_pics[ i ][ j ]               ue(v)
                max_vps_latency_increase_plus1[ i ][ j ]         ue(v)
            }
        }
    }
}
```

With regard to the first embodiment, above, the variable MaxSublayersLayersetMinus1[i] may be derived within the dpb_size( ) syntax structure (e.g., dpb_size( )), illustrated below, so that the signaling is related to the maximum temporal sub-layers in the corresponding layer set.

```
dpb_size( ) {
    for( i = 1; i < NumOutputLayerSets; i++ ) {
        olsIdx[ i ] = output_layer_set_idx_minus1[ i ]+1;
        for( k = 0, MaxSublayersLayersetMinus1[ i ]=0; k <
NumLayersetLayerIdList[ i ]; k++) {
            lid = LayerSetLayerIdList[ olsIdx[ i ] ][ k ];
            MaxSublayersLayersetMinus1[ i ]
            =Max(MaxSublayersLayersetMinus1[ i ],
            sub_layers_vps_max_minus1[ LayerIdxInVps[ lid ] ]);
        }
        sub_layer_flag_info_present_flag[ i ]                    u(1)
        for( j = 0; j <= MaxSublayersLayersetMinus1[i]; j++ ) {
            if( j > 0 && sub_layer_flag_info_present_flag[ i ] )
                sub_layer_dpb_info_present_flag[ i ][ j ]        u(1)
            if( sub_layer_dpb_info_present_flag[ i ][ j ] ) {
                for( k = 0; k < NumSubDpbs[ i ]; k++ )
                    max_vps_dec_pic_buffering_minus1[ i ][ k ][ j ]  ue(v)
                max_vps_num_reorder_pics[ i ][ j ]               ue(v)
                max_vps_latency_increase_plus1[ i ][ j ]         ue(v)
            }
        }
    }
}
```

It is to be understood that MaxSublayersLayersetMinus1[i] may be MaxSubLayersLayerset[i], or any other suitable variable name with any suitable reference value.

With regard to the second embodiment, above, the parameters max_vps_dec_pic_buffering_minus1[i][k][j] may be constrained considering the derived list of maximum temporal sub-layers. The dpb_size( ) syntax structure (e.g., dpb_size( )), illustrated below, so that the constraint on max_vps_dec_pic_buffering_minus1[i][k][j] is related to the derived list of maximum temporal sub-layers.

```
dpb_size( ) {
    for( i = 1; i < NumOutputLayerSets; i++ ) {
        sub_layer_flag_info_present_flag[ i ]                    u(1)
        for( j = 0; j <= vps_max_sub_layers_minus1; j++ ) {
            if( j > 0 && sub_layer_flag_info_present_flag[ i ] )
                sub_layer_dpb_info_present_flag[ i ][ j ]        u(1)
            if( sub_layer_dpb_info_present_flag[ i ][ j ] ) {
                for( k = 0; k < NumSubDpbs[ i ]; k++ )
                    max_vps_dec_pic_buffering_minus1[ i ][ k ][ j ]  ue(v)
                max_vps_num_reorder_pics[ i ][ j ]               ue(v)
                max_vps_latency_increase_plus1[ i ][ j ]         ue(v)
            }
        }
    }
}
```

'sub_layer_flag_info_present_flag'[i] equal to 1 may specify that sub_layer_dpb_info_present_flag[i][j] is present for i in the range of 1 to vps_max_sub_layers_minus1, inclusive. sub_layer_flag_info_present_flag[i] equal to 0 may specify that, for each value of j greater than 0, sub_layer_dpb_info_present_flag[i][j] is not present and the value is inferred to be equal to 0.

'sub_layer_dpb_info_present_flag'[i][j] equal to 1 may specify that max_vps_dec_pic_buffering_minus1[i][k][j] is present for k in the range of 0 to NumSubDpbs[i]−1, inclusive, for the j-th sub-layer, and max_vps_num_reorder_pics[i][j] and max_vps_latency_increase_plus1[i][j] are present for the j-th sub-layer. sub_layer_dpb_info_present_flag[i][j] equal to 0 may specify that the values of max_vps_dec_pic_buffering_minus1[i][k][j] are equal to max_vps_dec_pic_buffering_minus1[i][k][j−1] for k in the range of 0 to NumSubDpbs[i]−1, inclusive, and that the values max_vps_num_reorder_pics[i][j] and max_vps_latency_increase_plus1[i][j] are set equal to max_vps_num_reorder_pics[i][j−1] and max_vps_latency_increase_plus 1[i][j−1], respectively. The value of sub_layer_dpb_info_present_flag[i][0] for any possible value of i is inferred to be equal to 1.

'max_vps_dec_pic_buffering_minus1'[i][k][j] plus 1 may specify the maximum required size of the k-th sub-DPB for the CVS in the i-th output layer set in units of picture storage buffers when HighestTid is equal to j. When j is greater than 0, max_vps_dec_pic_buffering_minus1[i][k][j] shall be greater than or equal to max_vps_dec_pic_buffering_minus1[i][k][j−1]. When max_vps_dec_pic_buffering_minus1[i][k][j] is not present for j in the range of 1 to vps_max_sub_layers_minus1 − 1, inclusive, it is inferred to be equal to max_vps_dec_pic_buffering_minus1[ i ][ k ][ j − 1].

```
    for( i = 1; i < NumOutputLayerSets; i++ ) {
        olsIdx[ i ] = output_layer_set_idx_minus1[ i ]+1;
        for( k = 0; k < NumLayersetLayerIdList[ i ]; k++ ) {
            lid[ i ][ k ] = LayerSetLayerIdList[ olsIdx[ i ] ][ k ];
        }
    }
```

It is a requirement of bitstream conformance that for j in the range sub_layers_vps_max_minus1[LayerIdxInVps[lid[i][k]]] to vps_max_sub_layers_minus1, inclusive max_vps_dec_pic_buffering_minus1[i][k][j] is equal to max_vps_dec_pic_buffering_minus1[i][k][sub_layers_vps_max_minus1[LayerIdxInVps[lid[i][k]]]].

max_vps_num_reorder_pics[i][j] may specify, when HighestTid is equal to j, the maximum allowed number of access units containing a picture with PicOutputFlag equal to 1 that can precede any access unit auA that contains a picture with PicOutputFlag equal to 1 in the i-th output layer set in the CVS in decoding order and follow the access unit auA that contains a picture with PicOutputFlag equal to 1 in output order. When max_vps_num_reorder_pics[i][j] is not present for j in the range of 1 to vps_max_sub_layers_minus1−1, inclusive, due to sub_layer_dpb_info_present_flag

[i][j] being equal to 0, it is inferred to be equal to max_vps_num_reorder_pics[i][j 1].

'max_vps_latency_increase_plus1'[i][j] not equal to 0 is used to compute the value of VpsMaxLatencyPictures[i][j], which, when HighestTid is equal to j, may specify the maximum number of access units containing a picture with PicOutputFlag equal to 1 in the i-th output layer set that can precede any access unit auA that contains a picture with PicOutputFlag equal to 1 in the CVS in output order and follow the access unit auA that contains a picture with PicOutputFlag equal to 1 in decoding order. When max_vps_latency_increase_plus1[i][j] is not present for j in the range of 1 to vps_max_sub_layers_minus1−1, inclusive, due to sub_layer_dpb_info_present_flag[i][j] being equal to 0, it is inferred to be equal to max_vps_latency_increase_plus1[i][j−1].

When max_vps_latency_increase_plus1[i][j] is not equal to 0, the value of VpsMaxLatencyPictures[i][j] is specified as follows:

VpsMaxLatencyPictures[*i*][*j*]=max_vps_num_reorder_pics[*i*][*j*]+max_vps_latency_increase_plus1[*i*][*j*]−1    (F-4)

When max_vps_latency_increase_plus1[i][j] is equal to 0, no corresponding limit is expressed. The value of max_vps_latency_increase_plus1[i][j] shall be in the range of 0 to $2^{32}-2$, inclusive.

In another embodiment, the derivation of NumSubDpbs[i] may use an index into the NumLayersInIdList list. Also an inference for output_layer_set_idx_minus1[i] for default output layer sets may be defined. This derivation and defined inference may be defined as below:

output_layer_set_idx_minus1[i] shall be in the range of 0 to vps_num_layer_sets_minus1−1, inclusive. The length of the output_layer_set_idx_minus1[i] syntax element is Ceil (Log 2(vps_num_layer_sets_minus1)) bits.

The layer set for the i-th output layer set with i in the range of 0 to vps_num_layer_sets_minus1, inclusive, is inferred to be the i-th layer set. output_layer_set_idx_minus1[i] is inferred to be equal to i for i in the range of 0 to vps_num_layer_sets_minus1, inclusive.

The variable NumSubDpbs[i], specifying the number of sub-DPBs for the i-th output layer set, is set equal to NumLayersInIdList[output_layer_set_idx_minus1[i]+1].

In another embodiment, the output_layer_flag[i][j] is signalled for j equal to 0 to NumLayersInIdList[lsIdx] inclusive.

One example of signaling the NumLayersInIdList[lsIdx] in the vps_extension( ) is as shown below.

```
vps_extension( ) {
    avc_base_layer_flag
    ...
    if( numOutputLayerSets > 1 )
        default_one_target_output_layer_idc
    for( i = 1; i < numOutputLayerSets; i++ ) {
        if( i > vps_number_layer_sets_minus1 ) {
            output_layer_set_idx_minus1[ i ]
            lsIdx = output_layer_set_idx_minus1[ i ] + 1
            for( j = 0 ; j < NumLayersInIdList[ lsIdx ]; j++)
                output_layer_flag[ i ][ j ]
        }
        profile_level_tier_idx[ i ]
    }
    ...
}
```

Another example of signaling the NumLayersInIdList [lsIdx] in the vps_extension( ) is as shown below.

```
vps_extension( ) {
    avc_base_layer_flag
    ...
    if( numOutputLayerSets > 1 )
        default_one_target_output_layer_idc
    for( i = 1; i < numOutputLayerSets; i++ ) {
        if( i > vps_number_layer_sets_minus1 ) {
            output_layer_set_idx_minus1[ i ]
            lsIdx = output_layer_set_idx_minus1[ i ] + 1
            for( j = 0 ; j <= NumLayersInIdList[ lsIdx ] − 1; j++)
                output_layer_flag[ i ][ j ]
        }
        profile_level_tier_idx[ i ]
    }
    ...
}
```

'avc_base_layer_flag' equal to 1 may specify that the base layer conforms to Rec. ITU-T H.264|ISO/IEC 14496-10. avc_base_layer_flag equal to 0 may specify that the base layer conforms to this Specification.

'default_one_target_output_layer_idc' equal to 1 may specify that only the layer with the highest value of nuh_layer_id such that nuh_layer_id equal to nuhLayerIdA and AuxId[nuhLayerIdA] equal to 0 in each of the default output layer sets is a target output layer. default_one_target_output_layer_idc equal to 0 may specify that all layers in each of the default output layer sets are target output layers. default_one_target_output_layer_idc shall be equal to 0 or 1 in bitstreams conforming to this version of this Specification. Other values for default_one_target_output_layer_idc are reserved for future use by ITU-T|ISO/IEC.

'output_layer_set_idx_minus1'[i] plus 1 may specify the index of the layer set for the i-th output layer set. The value of output_layer_set_idx_minus1[i] shall be in the range of 0 to vps_num_layer_sets_minus1−1, inclusive. The length of the output_layer_set_idx_minus1[i] syntax element is Ceil (Log 2(vps_num_layer_sets_minus1)) bits.

The layer set for the i-th output layer set with i in the range of 0 to vps_num_layer_sets_minus1, inclusive, is inferred to be the i-th layer set.

The variable NumSubDpbs[i], which may specify the number of sub-DPBs for the i-th output layer set, is set equal to NumLayersInIdList[i]. In another embodiment The variable NumSubDpbs[i], specifying the number of sub-DPBs for the i-th output layer set, is set equal to NumLayersInIdList[output_layer_set_idx_minus1[i]+1].

'output_layer_flag'[i][j] equal to 1 may specify that the j-th layer in the i-th output layer set is a target output layer. output_layer_flag[i][j] equal to 0 may specify that the j-th layer in the i-th output layer set is not a target output layer.

'profile_level_tier_idx'[i] may specify the index, into the list of profile_tier_level( ) syntax structures in the VPS, of the profile_tier_level( ) syntax structure that applies to i-th output layer set. The length of the profile_level_tier_idx[i] syntax element is Ceil(Log 2(vps_num_profile_tier_level_minus1+1)) bits. The value of profile_level_tier_idx[0] is inferred to be equal to 0. The value of profile_level_tier_idx [i] shall be in the range of 0 to vps_num_profile_tier_level_minus1, inclusive.

In another embodiment one or more syntax elements could be signaled fewer or more number of times than shown above. For example a 1 bit flag value may be shown to be signaled N times. Instead it may be signaled M times where M may be more than N or M may be less than N.

In another embodiment one or more of the syntax elements may be signaled using a known fixed number of bits instead of u(v) instead of ue(v). For example they could be signaled using u(8) or u(16) or u(32) or u(64), etc.

In another embodiment one or more of these syntax element could be signaled with ue(v) or some other coding scheme instead of fixed number of bits such as u(v) coding.

In another embodiment the names of various syntax elements and their semantics may be altered by adding a plus1 or plus2 or by subtracting a minus1 or a minus2 compared to the described syntax and semantics.

In yet another embodiment various syntax elements may be signaled per picture anywhere in the bitstream. For example they may be signaled in slice segment header, pps/ sps/ vps/ or any other parameter set or other normative part of the bitstream.

In yet another embodiments all the embodiments related to output layer sets could be applied to output operation points [2,3] and/or to operation points [1].

The term "computer-readable medium" refers to any available medium that can be accessed by a computer or a processor. The term "computer-readable medium," as used herein, may denote a computer- and/or processor-readable medium that is nontransitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray (registered trademark) disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for decoding a video sequence that includes a picture comprising:
    (a) receiving said video sequence;
    (b) determining a number of output layers set for said video sequence;
    (c) decoding a characteristic of a decoded picture buffer for one of sub layers included in one of said output layer sets, wherein
    said characteristic specifies a maximum number of access units containing a picture with a picture output flag equal to 1 that can precede a first access unit that contains a picture with a picture output flag equal to 1 in a decoding order and follow said first access unit in an output order.

* * * * *